US 12,318,031 B2
Jun. 3, 2025

(12) United States Patent
Yeom

(54) COOKING DEVICE

(71) Applicant: CUCHEN CO., LTD, Seoul (KR)

(72) Inventor: Kyu Hyun Yeom, Chungcheongnam-do (KR)

(73) Assignee: CUCHEN CO., LTD, Seoul (KR)

( * ) Notice: Subject to any disclaimer, the term of this patent is extended or adjusted under 35 U.S.C. 154(b) by 18 days.

(21) Appl. No.: 18/567,022

(22) PCT Filed: Jun. 14, 2022

(86) PCT No.: PCT/KR2022/008400
§ 371 (c)(1),
(2) Date: Dec. 5, 2023

(87) PCT Pub. No.: WO2022/265351
PCT Pub. Date: Dec. 22, 2022

(65) Prior Publication Data
US 2024/0260778 A1    Aug. 8, 2024

(30) Foreign Application Priority Data

Jun. 14, 2021  (KR) .................. 10-2021-0077035
Jun. 14, 2021  (KR) .................. 10-2021-0077036
Jun. 14, 2021  (KR) .................. 10-2021-0077037

(51) Int. Cl.
*A47J 27/092*   (2006.01)
*A47J 27/08*    (2006.01)

(52) U.S. Cl.
CPC ......... *A47J 27/092* (2013.01); *A47J 27/0802* (2013.01)

(58) Field of Classification Search
CPC ................................................ A47J 27/0802
See application file for complete search history.

(10) Patent No.: US 12,318,031 B2
(45) Date of Patent: Jun. 3, 2025

(56) References Cited

U.S. PATENT DOCUMENTS

2019/0008310 A1    1/2019  Kim et al.
2019/0069706 A1 *  3/2019  Kim et al. .............. A47J 27/08

FOREIGN PATENT DOCUMENTS

CN    202234760 U1 *  5/2012  .............. A47J 27/08
CN    107259978 A     10/2017
(Continued)

OTHER PUBLICATIONS

Machine translation of CN 108143258 A1 performed on May 21, 2024, Qiu et al. (Year: 2018).*
(Continued)

*Primary Examiner* — Ibrahime A Abraham
*Assistant Examiner* — Kevin Guanhua Wen
(74) *Attorney, Agent, or Firm* — Nicholas Park

(57) ABSTRACT

A cooking device according to an embodiment of the present disclosure includes: a first pressure control device including: a first lower cylinder including a first lower flow path communicating with an accommodation space in the inner pot; a first upper cylinder disposed on the first lower cylinder and comprising a first upper flow path; and a first weight disposed on the first upper cylinder and configured to open/close the first upper flow path, and a shutter structure configured to switch between an opening position for opening the first lower flow path and a closing position for closing the first lower flow path; and a second pressure control device including a second cylinder which includes a second flow path communicating with the accommodation space, and a second weight which is disposed on the second cylinder and configured to open/close the second flow path.

9 Claims, 26 Drawing Sheets

(56) References Cited

FOREIGN PATENT DOCUMENTS

| | | | |
|---|---|---|---|
| CN | 108143256 A1 * | 6/2018 | ............ A47J 36/38 |
| CN | 108143258 A1 * | 6/2018 | ......... A47J 27/0802 |
| CN | 108720580 A | 11/2018 | |
| CN | 109770706 A | 5/2019 | |
| CN | 110025214 A | 7/2019 | |
| JP | H11151160 A1 * | 6/1999 | ............ A47J 27/09 |
| JP | 2000-037296 A | 2/2000 | |
| JP | 2007-044538 A | 2/2007 | |
| JP | 2010-178964 A | 8/2010 | |
| KR | 19980029120 U1 * | 8/1998 | ............ A47J 27/09 |
| KR | 10-0279848 B1 | 6/2001 | |
| KR | 200342108 Y1 * | 2/2004 | ......... A47J 27/0802 |
| KR | 10-2006-0099548 A | 9/2006 | |
| KR | 10-2009-0002411 A | 1/2009 | |
| KR | 20-2010-0000564 U | 1/2010 | |
| KR | 10-2010-0067167 A | 6/2010 | |
| KR | 10-1615910 B1 | 5/2016 | |
| KR | 10-2019-0027604 A | 3/2019 | |
| KR | 10-2021-0050328 A | 5/2021 | |
| SU | 1088700 A1 | 4/1984 | |
| WO | WO-2020232797 A1 * | 11/2020 | ............ A47J 27/04 |

OTHER PUBLICATIONS

Machine translation of CN 202234760 U1 performed on May 21, 2024, Qiu et al. (Year: 2012).*

Machine translation of KR 19980029120 U1 performed on May 21, 2024, Kim (Year: 1998).*

Machine translation of WO 2020232797 A1 performed on May 21, 2024, Luo et al. (Year: 2020).*

Machine translation of CN 108143256 A1 performed on May 22, 2024, Peng (Year: 2018).*

Machine translation of KR 200342108 Y1 performed on May 22, 2024, Wonyoung (Year: 2004).*

Machine translation of JP H11151160 A1 performed on Sep. 10, 2024, Hueppi (Year: 1999).*

WIPO, International Search Report for International Application No. PCT/KR2022/008400, Aug. 31, 2022, 5 pages.

KIPO, Decision to Grant a Patent for Korean Patent Application No. 10-2021-0077035, May 25, 2022.

KIPO, Decision to Grant a Patent for Korean Patent Application No. 10-2021-0077036, May 25, 2022.

KIPO, Decision to Grant a Patent for Korean Patent Application No. 10-2021-0077037, May 25, 2022.

* cited by examiner

FIG. 10
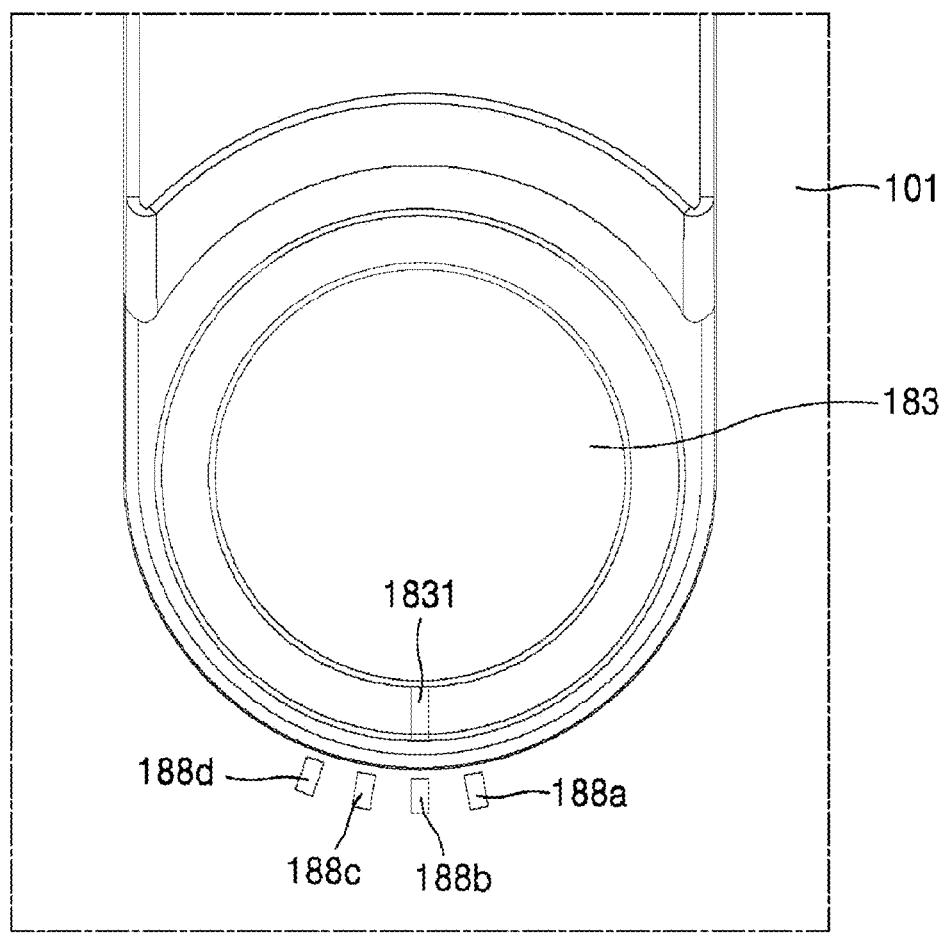
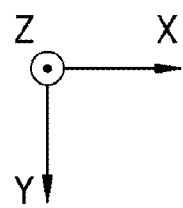

FIG. 12

| Rotation position of manipulation handle 183 | First rotation position | Second rotation position | Third rotation position | Fourth rotation position |
|---|---|---|---|---|
| Position of guide protrusion 175 | First position P1 | Second position P2 | Third position P3 | Fourth position P4 |
| Position of locking structure 170 | Locking position | Unlocking position | Locking position | Locking position |
| Position of lift pin 181 | Pin-up | Pin-up | Pin-down | Pin-down |
| Position of shutter structure 147 | Opening position | Opening position | Opening position | Closing position |
| Pressure of inner pot | No pressure | No pressure | First pressure | Second pressure |

FIG. 16

| Rotation position of manipulation handle 183 | First rotation position | Second rotation position | Fourth rotation position | Fourth rotation position |
|---|---|---|---|---|
| Position of guide protrusion 175 | First position P1 | Second position P2 | Fourth position P4 | Fourth position P4 |
| Position of locking structure 170 | Locking position | Unlocking position | Locking position | Locking position |
| Position of lift pin 181 | Pin-up | Pin-up | Pin-down | Pin-down |
| Position of shutter structure 310 | Opening position | Opening position | Opening position | Closing position |
| Pressure of inner pot | No pressure | No pressure | First pressure | Second pressure |

FIG. 20

| Rotation position of manipulation handle 183 | First rotation position | Second rotation position | Fourth rotation position | Fourth rotation position |
|---|---|---|---|---|
| Position of guide protrusion 175 | First position P1 | Second position P2 | Fourth position P4 | Fourth position P4 |
| Position of locking structure 170 | Locking position | Unlocking position | Locking position | Locking position |
| Position of lift pin 181 | Pin-up | Pin-up | Pin-down | Pin-down |
| Position of first shutter rod 323 | Opening position | Opening position | Opening position | Closing position |
| Position of second shutter rod 324 | Opening position | Opening position | Opening position, closing position | Opening position |
| Pressure of inner pot | No pressure | No pressure | First pressure | Second pressure |

COOKING DEVICE

CROSS-REFERENCE TO RELATED APPLICATION

This application is the National Phase of PCT International Application No. PCT/KR2022/008400, filed on Jun. 14, 2022, which claims the benefit of Korean Application No. 10-2021-0077035 filed on Jun. 14, 2021, Korean Application No. 10-2021-0077036 filed on Jun. 14, 2021, and Korean Application No. 10-2021-0077037 filed on Jun. 14, 2021, which is hereby incorporated by reference herein in their entirety.

TECHNICAL FIELD

The present disclosure relates to a cooking device, and more particularly, to a cooking device that enables cooking ingredients at high pressure.

BACKGROUND

In general, as a representative example of a cooking device, an electric pressure rice cooker is a device capable of selectively performing a cooking function for cooking rice and a warming function for maintaining cooked rice at a constant temperature. In an electric pressure rice cooker, a main body lid in which a steam discharge hole is formed may be installed on a main body to be openable/closable, an inner pot may be detachably built in the main body, and an inner pot lid may be separately provided to cover the inner pot. An induction heating-type or hot plate-type heater is provided in the main body to transfer heat to the cooking ingredients accommodated in the inner pot, such as rice, mixed grains, or other food ingredients, so that the cooking ingredients can be cooked.

SUMMARY

In view of the foregoing, the technical ideas of the present disclosure provide a cooking device that is capable of improving user convenience and cooking quality.

A cooking device according to an embodiment of the present disclosure includes: a main body configured to accommodate an inner pot; a top plate provided in a lid cover coupled to the main body; a rotation cover rotatably coupled to the top plate to be rotatable along an edge of the top plate; a first pressure control device including a first lower cylinder which includes a first lower flow path communicating with an accommodation space in the inner pot, a first upper cylinder which is disposed on the first lower cylinder and includes a first upper flow path, a first weight which is disposed on the first upper cylinder and configured to open/close the first upper flow path depending on a steam pressure of the accommodation space in the inner pot, and a shutter structure which is configured to switch between an opening position for opening an outlet of the first lower flow path such that the first lower flow path and the first upper flow path communicate with each other and a closing position for closing the outlet of the first lower flow path such that the first lower flow path and the first upper flow path do not communicate with each other; and a second pressure control device including a second cylinder which includes a second flow path communicating with the accommodation space in the inner pot, and a second weight which is disposed on the second cylinder and configured to open/close the second flow path depending on the steam pressure of the accommodation space in the inner pot.

In exemplary embodiments, the first pressure control device may be configured to maintain the steam pressure of the accommodation space in the inner pot at a first pressure, and the second pressure control device may be configured to maintain the steam pressure of the accommodation space in the inner pot at a second pressure higher than the first pressure.

In exemplary embodiments, the shutter structure may include a shutter frame coupled to the first lower cylinder, a shutter rod movabley mounted to the shutter frame, an elastic cover coupled to an end portion of the shutter rod facing the outlet of the first lower flow path, and a first elastic body configured to elastically support the shutter rod.

In exemplary embodiments, the cooking device may further include a push structure configured to press the shutter structure to be fixed at the closing position, and the push structure may be coupled to the rotation cover and configured to selectively press the shutter structure depending on a rotation angle of the rotation cover.

In exemplary embodiments, the push structure may include a fixed body coupled to the rotation cover, a second elastic body mounted to the fixed body, and a movable body which is elastically supported by the second elastic body to be capable of pressing the shutter rod.

In exemplary embodiments, the cooking device may further include a lift pin mounted to the lid cover to be movable up and down, wherein the lift pin may be configured to move up and down between a pin-down position and a pin-up position depending on a rotation angle of the rotation cover, and wherein the lift pin may be located at the pin-up position to lift the first weight such that the outlet of the first upper flow path in the first upper cylinder is forcibly opened and to lift the second weight such that the outlet of the second flow path in the second cylinder is forcibly opened.

In exemplary embodiments, the cooking device may further include a locking structure including an engagement protrusion configured to be engaged with a flange portion of the inner pot, wherein the locking structure may be mounted on the top plate to be linearly movable, and wherein the locking structure may be configured to linearly move, depending on a rotation angle of the rotation cover, between a locking position where the engagement protrusion is located to vertically overlap the flange portion of the inner pot and an unlocking position that is spaced radially outward from the locking position.

In exemplary embodiments, the rotation cover includes a guide groove that has a first position, a second position, a third position, and a fourth position sequentially disposed along the extension direction thereof, wherein the first position, the third position, and the fourth position of the guide groove may each be spaced apart from a rotation center of the rotation cover by a first distance, and wherein the second position of the guide groove may be spaced apart from the rotation center of the rotation cover by a second distance greater than the first distance. The locking structure may further include a guide protrusion accommodated in the guide groove and located at one of the first to fourth positions of the guide groove depending on the rotation angle of the rotation cover. When the guide protrusion is located at the first position, the third position, and the fourth position of the guide groove, the locking structure may be located in the locking position. When the guide protrusion of the locking structure is located at the second position of the guide groove, the locking structure may be located at the unlocking position.

In exemplary embodiments, the cooking device may further include a lift pin configured to move up and down between a pin-down position and a pin-up position depending on the rotation angle of the rotation cover and selectively press the first weight and the second weight, and a push structure configured to selectively press the shutter structure depending on the rotation cover to switch the shutter structure between the opening position and the closing position. When the guide protrusion of the locking structure is located at the first position and the second position of the guide groove, the lift pin may be located at the pin-up position of lifting the first weight and the second weight such that the outlet of the first upper flow path in the first upper cylinder and the outlet of the second flow path in the second cylinder are forcibly opened. When the guide protrusion of the locking structure is located at the third position and the fourth position of the guide groove, the lift pin may be located at a pin-down position lowered from the pin-up position. When the guide protrusion of the locking structure is located at the first position, the second position, and the third position of the guide groove, the push structure is spaced away from the shutter structure such that the shutter structure may be located at the opening position. When the guide protrusion of the locking structure is located at the fourth position of the guide groove, the push structure may press the shutter structure such that the shutter structure is fixed at the closing position.

A cooking device according to another embodiment of the present disclosure includes: a main body configured to accommodate an inner pot; a top plate provided in a lid cover coupled to the main body; a rotation cover rotatably coupled to the top plate to be rotatable along the edge of the top plate; a first pressure control device including a first lower cylinder which includes a first lower flow path communicating with an accommodation space in the inner pot, a first upper cylinder which includes a first upper flow path communicating with the first lower flow path, and a first weight which is disposed on the first upper cylinder and configured to open/close the first upper flow path depending on a steam pressure of the accommodation space in the inner pot; and a second pressure control device including a second lower cylinder which includes a second lower flow path communicating with the accommodation space in the inner pot, a second upper cylinder which includes a second upper flow path communicating with the second lower flow path, and a second weight which is disposed on the second upper cylinder and configured to open/close the second upper flow path depending on the steam pressure of the accommodation space in the inner pot; and a shutter structure including a first shutter rod configured to move between a closing position of being inserted into the first lower flow path to close the first lower flow path and an opening position of opening the first lower flow path, a second shutter rod configured to move between a closing position of being inserted into the second lower flow path to close the second lower flow path and an opening position of opening the second lower flow path, and an actuator configured to drive the first shutter rod and the second shutter rod.

In exemplary embodiments, the first pressure control device may be configured to maintain the steam pressure of the accommodation space in the inner pot at a first pressure, and the second pressure control device may be configured to maintain the steam pressure of the accommodation space in the inner pot at a second pressure higher than the first pressure.

In exemplary embodiments, the cooking device may further include a lift pin mounted to the lid cover to be movable up and down, wherein the lift pin may be configured to move up and down between a pin-down position and a pin-up position depending on a rotation angle of the rotation cover. The lift pin may be located at the pin-up position to lift the first weight such that the outlet of the first upper flow path in the first upper cylinder is forcibly opened and to lift the second weight such that the outlet of the second flow path in the second cylinder is forcibly opened.

In exemplary embodiments, the rotation cover may include a first surface portion at a first height and a second surface portion at a second height lower than the first height. The lift pin may be supported on the first surface portion of the rotation cover and located at the pin-up position, and may be supported on the second surface portion of the rotation cover to be located at the pin-down position lowered from the pin-up position.

In exemplary embodiments, the cooking device may further include a locking structure including an engagement protrusion configured to be engaged with a flange portion of the inner pot. The locking structure may be mounted to the top plate to be linearly movable. The locking structure may be configured to linearly move, depending on a rotation angle of the rotation cover, between a locking position where the engagement protrusion is located to vertically overlap the flange portion of the inner pot and an unlocking position that is spaced radially outward from the locking position.

In exemplary embodiments, the rotation cover may include a guide groove including a first position, a second position, and a third position sequentially disposed along the extension direction thereof. The first position and the third position of the guide groove may each be spaced apart from a rotation center of the rotation cover by a first distance. The second position of the guide groove may be spaced apart from the rotation center of the rotation cover by a second distance greater than the first distance. The locking structure may further include a guide protrusion accommodated in the guide groove and located at one of the first to third positions of the guide groove depending on the rotation angle of the rotation cover. When the guide protrusion is located at the first position and the third position of the guide groove, the locking structure may be located at the locking position. When the guide protrusion of the locking structure is located at the second position of the guide groove, the locking structure may be located at the unlocking position.

In exemplary embodiments, the cooking device may further include a lift pin configured to move up and down between a pin-down position and a pin-up position depending on the rotation angle of the rotation cover and selectively press the first weight and the second weight. When the guide protrusion of the locking structure is located at the first position and the second position of the guide groove, the lift pin may be located at the pin-up position of lifting the first weight and the second weight such that the outlet of the first upper flow path in the first upper cylinder and the outlet of the second upper flow path in the second upper cylinder are forcibly opened. When the guide protrusion of the locking structure is located at the third position of the guide groove, the lift pin may be located at the pin-down position lowered from the pin-up position. When the guide protrusion of the locking structure is located at the first position and the second position of the guide groove, the shutter structure may place the first shutter rod and the second shutter rod at the opening position such that the first lower flow path and the second lower flow path are opened. When the guide protrusion of the locking structure is located at the third position of the guide groove, the shutter structure may place the first shutter rod at the opening position such that the steam pressure of the accommodation space in the inner pot is maintained at a first pressure. The shutter structure may be configured, when the guide protrusion of the locking structure is located at the third position of the guide groove, to place the first shutter rod at the closing position and to place the second shutter rod at the opening position such that the steam pressure of the accommodation space in the inner pot is maintained at a second pressure higher than the first pressure.

A cooking device according to another embodiment of the present disclosure includes: a main body configured to accommodate an inner pot; a top plate provided in a lid cover coupled to the main body; a rotation cover rotatably coupled to the top plate to be rotatable along the edge of the top plate; a first pressure control device including a first lower cylinder which includes a first lower flow path communicating with an accommodation space in the inner pot, a first upper cylinder which includes a first upper flow path communicating with the first lower flow path, a first weight which is disposed on the first upper cylinder and configured to open/close the first upper flow path depending on the steam pressure of the accommodation space in the inner pot, and a shutter structure configured to open/close the first lower flow path; and a second pressure control device including a second cylinder which includes a second flow path communicating with the accommodation space in the inner pot, and a second weight which is disposed on the second cylinder and configured to open/close the second flow path depending on the steam pressure of the accommodation space in the inner pot. The shutter structure includes a shutter rod configured to move between the closing position of being inserted into the first lower flow path to close the first lower flow path and an opening position of opening the first lower flow path, and an actuator configured to drive the shutter rod.

In exemplary embodiments, the first pressure control device may be configured to maintain the steam pressure of the accommodation space in the inner pot at a first pressure. The second pressure control device may be configured to maintain the steam pressure of the accommodation space in the inner pot at a second pressure higher than the first pressure.

In exemplary embodiments, the cooking device may further include a lift pin mounted to the lid cover to be movable up and down. The lift pin may be configured to move up and down between a pin-down position and a pin-up position depending on a rotation angle of the rotation cover. The lift pin may be located at the pin-up position to lift the first weight such that the outlet of the first upper flow path in the first upper cylinder is forcibly opened and to lift the second weight such that the outlet of the second flow path in the second cylinder is forcibly opened.

In exemplary embodiments, the rotation cover may include a first surface portion at a first height and a second surface portion at a second height lower than the first height. The lift pin may be supported on the first surface portion of the rotation cover and located at the pin-up position, and may be supported on the second surface portion of the rotation cover to be located at the pin-down position lowered from the pin-up position.

In exemplary embodiments, the cooking device may further include a locking structure including an engagement protrusion configured to be engaged with a flange portion of the inner pot. The locking structure may be mounted to the top plate to be linearly movable. The locking structure may be configured to linearly move, depending on a rotation angle of the rotation cover, between a locking position where the engagement protrusion is located to vertically overlap the flange portion of the inner pot and an unlocking position that is spaced radially outward from the locking position.

In exemplary embodiments, the rotation cover may include a guide groove including a first position, a second position, and a third position sequentially disposed along the extension direction thereof. The first position and the third position of the guide groove may each be spaced apart from a rotation center of the rotation cover by a first distance. The second position of the guide groove may be spaced apart from the rotation center of the rotation cover by a second distance greater than the first distance. The locking structure may further include a guide protrusion accommodated in the guide groove and located at one of the first to third positions of the guide groove depending on the rotation angle of the rotation cover. When the guide protrusion is located at the first position and the third position of the guide groove, the locking structure may be located at the locking position. When the guide protrusion of the locking structure is located at the second position of the guide groove, the locking structure may be located at the unlocking position.

In exemplary embodiments, the cooking device may further include a lift pin configured to move up and down between a pin-down position and a pin-up position depending on the rotation angle of the rotation cover and selectively press the first weight and the second weight. When the guide protrusion of the locking structure is located at the first position and the second position of the guide groove, the lift pin may be located at the pin-up position of lifting the first weight and the second weight such that the outlet of the first upper flow path in the first upper cylinder and the outlet of the second flow path in the second cylinder are forcibly opened. When the guide protrusion of the locking structure is located at the third position of the guide groove, the lift pin may be located at the pin-down position lowered from the pin-up position. When the guide protrusion of the locking structure is located at the first position and the second position of the guide groove, the shutter structure may place the shutter rod at the opening position such that the first lower flow path is opened. When the guide protrusion of the locking structure is located at the third position of the guide groove, the shutter structure may place the shutter rod at the opening position such that the steam pressure of the accommodation space in the inner pot is maintained at a first pressure. When the guide protrusion of the locking structure is located at the third position of the guide groove, the shutter structure may place the first shutter rod at the closing position such that the steam pressure of the accommodation space in the inner pot is maintained at a second pressure higher than the first pressure.

According to exemplary embodiments of the present disclosure, the cooking device provides various pressure cooking modes, for example, a non-pressure cooking mode (or low-pressure cooking mode) for cooking with no pressure, a first pressure cooking mode for cooking with the first pressure, and a second high-pressure cooking mode with the second pressure, it is possible to conduct cooking depending on cooking ingredients and a user's taste. Accordingly, user convenience and cooking quality can be improved.

BRIEF DESCRIPTION OF THE DRAWINGS

FIG. 10 is a plan view illustrating a manipulation handle of the lid assembly.

FIG. 12 is a table representing a change in a position of a guide protrusion, an operation of a locking structure, an operation of a lift pin, an operation of a shutter structure, and a change in the pressure of the inner pot according to a change in the rotation position of the manipulation handle.

FIG. 16 is a table representing a change in a position of a guide protrusion, a position of the locking structure, a position of the lift pin, a position of the shutter structure, and a change in the pressure of the inner pot according to a change in a rotation position of a manipulation handle in a cooking assembly including the lid assembly of FIG. 13.

FIG. 20 is a table representing a change in a position of the guide protrusion, a position of the locking structure, a position of the lift pin, a position of the shutter structure, and a change in the pressure of the inner pot according to a change in a rotation position of a manipulation handle in a cooking assembly including the lid assembly of FIG. 17.

DETAILED DESCRIPTION

Figure 1:
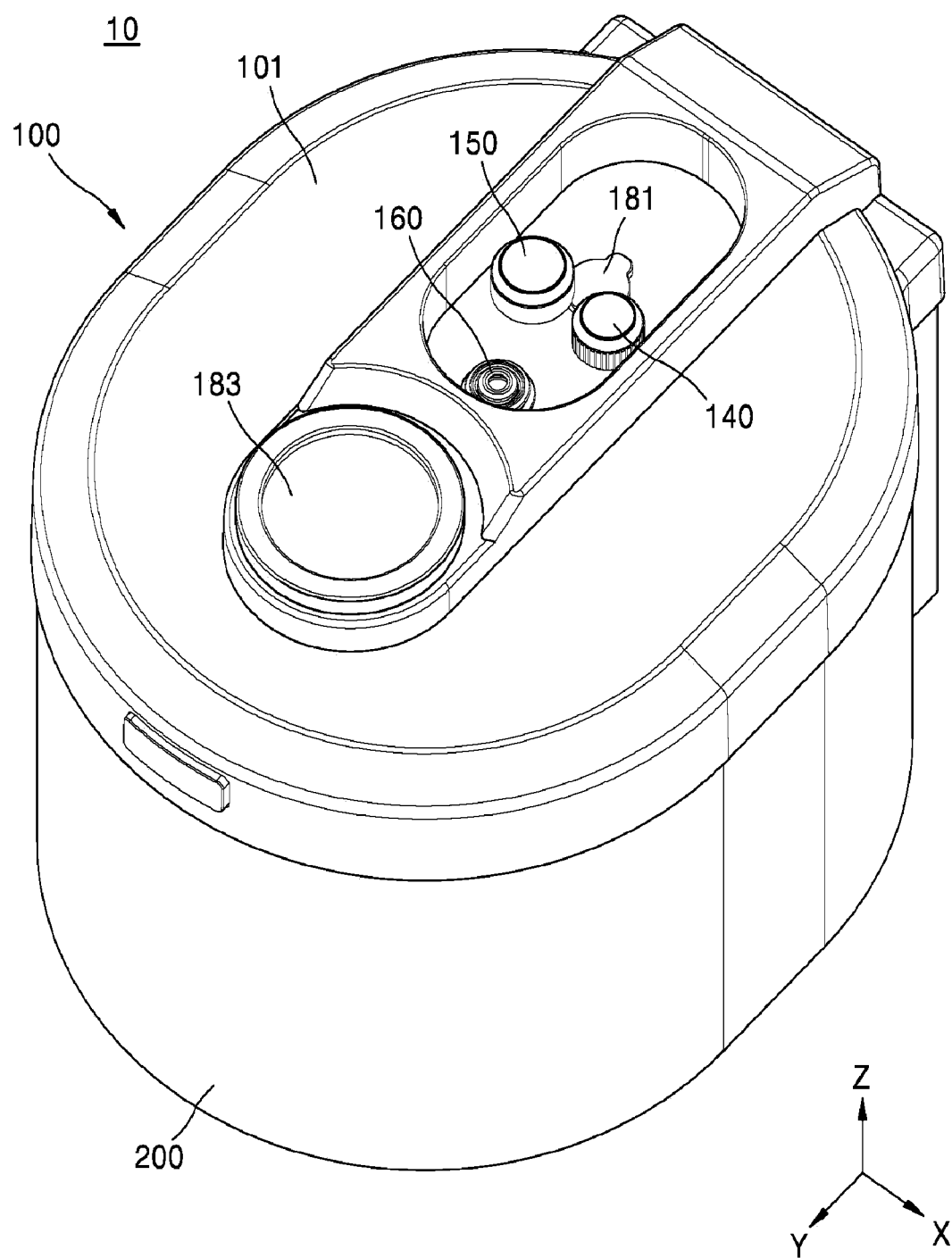
FIG. 1 is a perspective view illustrating a cooking device according to exemplary embodiments of the present disclosure.

Hereinafter, embodiments of the technical ideas of the present disclosure will be described in detail with reference to the accompanying drawings. The same reference numerals are used for the same components in the drawings, and duplicate descriptions thereof will be omitted.

Figure 2:
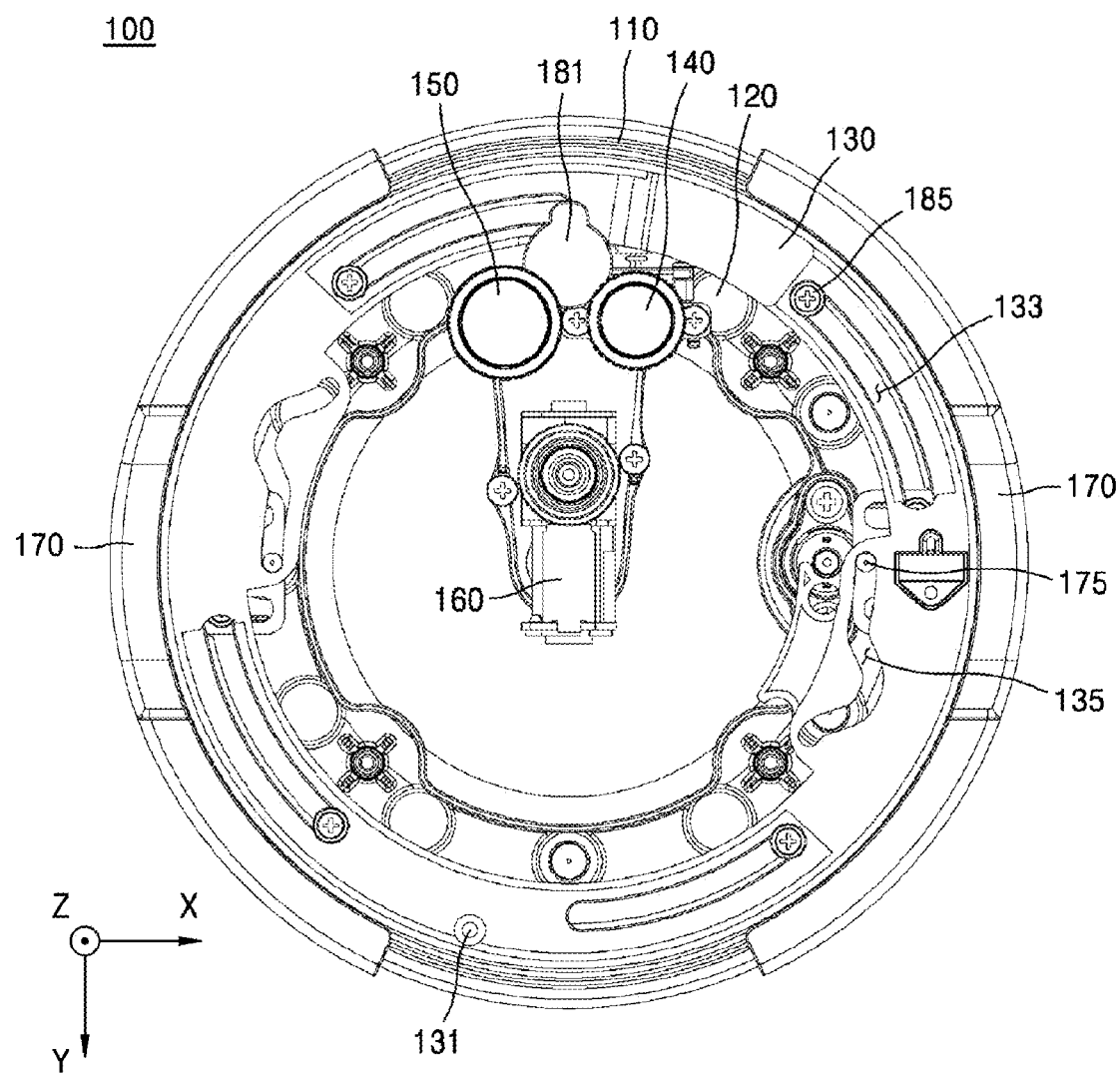
FIG. 2 is a plan view illustrating main components of a lid assembly of FIG. 1.
Figure 3:
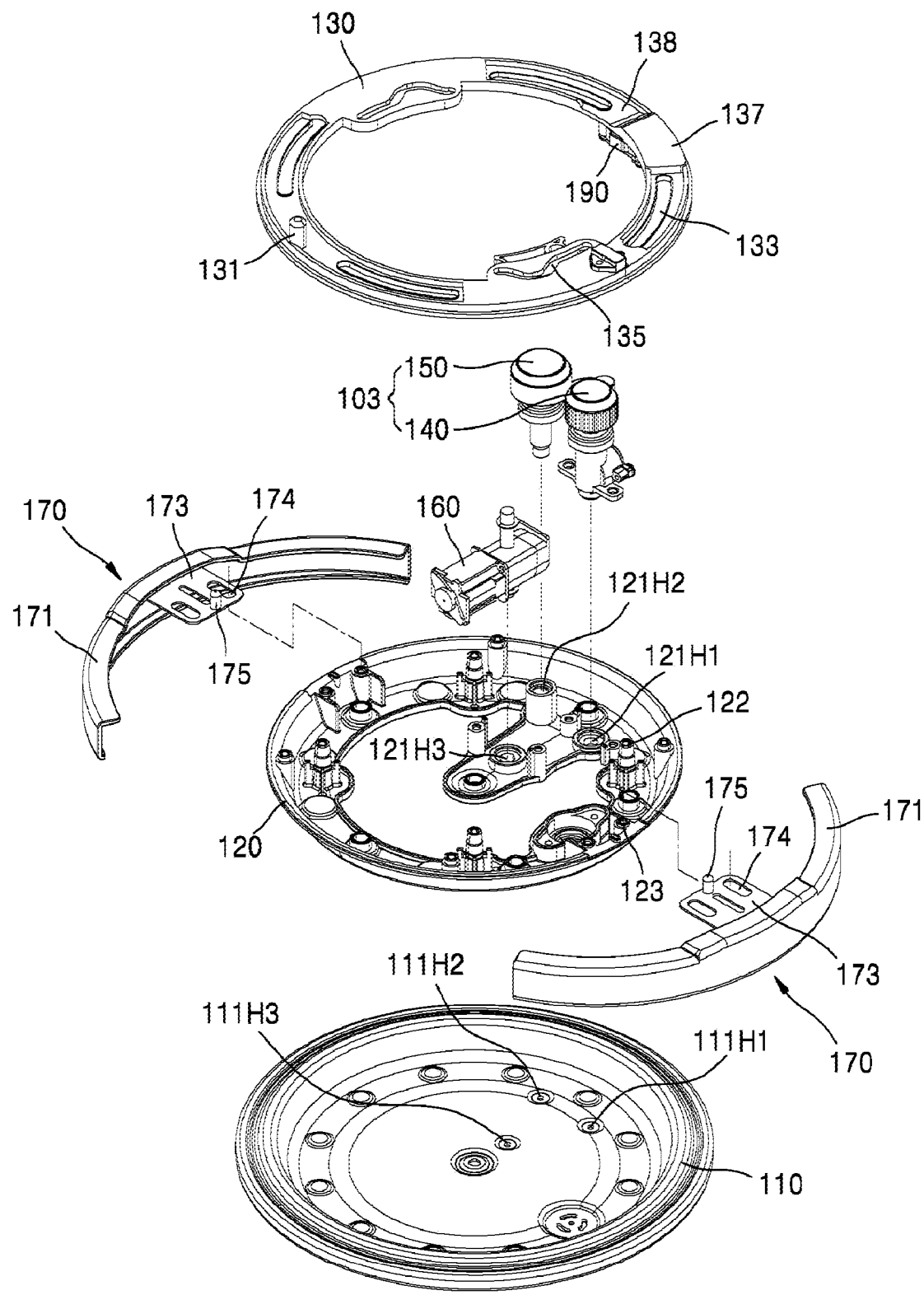
FIG. 3 is an exploded perspective view illustrating main components of the lid assembly of FIG. 1.

FIG. 1 is a perspective view illustrating a cooking device 10 according to exemplary embodiments of the present disclosure. FIG. 2 is a plan view illustrating main components of a lid assembly 100 of FIG. 1. FIG. 3 is an exploded perspective view illustrating the main components of the lid assembly 100 of FIG. 1.

Referring to FIGS. 1 to 3, the cooking device 10 may include a main body 200 including a cooking space in which cooking ingredients can be cooked, and a lid assembly 100 installed on the main body 200.

The main body 200 may accommodate an inner pot (210 in FIG. 8A) configured to accommodate cooking ingredients. The inner pot 210 may have a container shape and may include an accommodation space in which cooking ingredients are accommodated. The inner pot 210 may be detachably accomodated in the cooking space of the main body 200. In exemplary embodiments, the inner pot 210 may include a flange portion (211 in FIG. 8A) protruding outward from its upper end edge. The flange portion 211 may extend along the upper end edge of the inner pot 210. A plurality of flange portions 211, which are spaced apart from one another along the upper end edge of the inner pot 210, may be arranged at the upper end of the inner pot 210. The main body 200 may include a heating source for heating the cooking ingredients accommodated in the inner pot 210. For example, the main body 200 may include a hot plate-type heater or an induction heating-type heater.

The lid assembly 100 may cover the cooking space in the main body 200 and/or the accommodation space in the inner pot 210. The lid assembly 100 may be configured to seal the accommodation space in the inner pot 210 and/or the cooking space in the main body 200 such that a pressure suitable for cooking is formed in the accommodation space in the inner pot 210 while the cooking ingredients are being cooked. In exemplary embodiments, the lid assembly 100 may be hinged to one side of the main body 200 and may rotate about a hinge axis. The lid assembly 100 may rotate between a closed position at which the lid assembly covers the accommodation space in the inner pot 210 and an opened position at which the lid assembly opens the accommodation space in the inner pot 210. In exemplary embodiments, the lid assembly 100 may be detachably coupled to the main body 200.

The lid assembly 100 may include a lid cover 101, an inner pot cover 110, a top plate 120, a rotation cover 130, a pressure control device 103, a solenoid valve 160, a locking structure 170, and a push structure 190.

The lid cover 101 may be coupled to the main body 200. The lid cover 101 may form the exterior of the lid assembly 100. The lid cover 101 may provide a space in which various electric components can be installed.

The inner pot cover 110 may be disposed under the lid assembly 100 facing the inner pot 210. The inner pot cover 110 may be mounted to the top plate 120 and/or the lid cover 101. The inner pot cover 110 may cover the inner pot 210 accommodated in the main body 200. The inner pot cover 110 may include a first lower steam hole 111H1, a second lower steam hole 111H2, and a third lower steam hole 111H3 which communicate with the accommodation space in the inner pot 210. A packing mounting groove to which a packing 189 for sealing the space between the inner pot 210 and the inner pot cover 110 is mounted may be formed at the edge portion of the inner pot cover 110.

The top plate 120 may be disposed on the inner pot cover 110. The top plate 120 may be disposed within the lid cover 101 and coupled to the lid cover 101. The top plate 120 may include a first upper steam hole 121H1 communicating with the first lower steam hole 111H1 of the inner pot cover 110, a second upper steam hole 121H2 communicating with the second lower steam hole 111H2, and a third upper steam hole 121H3 communicating with the third lower steam hole 111H3.

The rotation cover 130 may be disposed on the top plate 120. The rotation cover 130 may have a ring shape extending substantially along the edge of the top plate 120. The rotation cover 130 may be rotatably coupled to the top plate 120 to be rotatable along the edge of the top plate 120. The rotation cover 130 may be configured to rotate about a rotation axis direction (Z direction) in a first rotation direction (e.g., clockwise direction) and a second rotation direction (e.g., counterclockwise direction) opposite to the first rotation direction.

The rotation cover 130 may be configured to rotate in association with the rotation of the manipulation handle 183 protruding from the lid cover 101. Rotation of the manipulation handle 183 in the first rotation direction causes the rotation cover 130 to rotate in the first rotation direction, and rotation of the manipulation handle 183 in the second rotation direction causes the rotation cover 130 to rotate in the second rotation direction.

More specifically, the manipulation handle 183 and the rotation cover 130 may be connected via a connection lever (not illustrated) that rotates about the rotation axis of the manipulation handle 183 when the manipulation handle 183 rotates. One end of the connection lever may be connected to the manipulation handle 183, and the other end of the connection lever may be connected to a connection protrusion 131 of the rotation cover 130. For example, when the manipulation handle 183 is rotated by a user's manipulation, the connection lever rotates in association with the rotation of the manipulation handle 183, and the rotation cover 130 connected to the connection lever via the connection protrusion 131 may rotate along the edge of the top plate 120.

The rotation cover 130 may be configured to rotate on the top plate 120 within a predetermined rotation angle range. The rotation cover 130 may include a rotation restriction groove 133 extending along the rotation direction of the rotation cover 130 or along the edge of the rotation cover 130. The rotation restriction groove 133 may guide the rotation movement of the rotation cover 130 as well as limiting the rotation movement range of the rotation cover 130.

More specifically, a fastening structure 185 such as a screw may be inserted into a boss 122 of the top plate 120 below the rotation restriction groove 133 through the rotation restriction groove 133. The rotation of the rotation cover 130 may be restricted between a position where the fastening structure 185 is located at one end portion of the rotation restriction groove 133 and a position where the fastening structure 185 is located at the other end portion of the rotation restriction groove 133.

The pressure control device 103 may be configured to control the pressure of the accommodation space in the inner pot 210 by controlling the discharge of steam depending on the pressure level of the accommodation space in the inner pot 210. The pressure control device 103 may include a first pressure control device 140 and a second pressure control device 150 mounted on the top plate 120. The first pressure control device 140 and the second pressure control device 150 may each include a poise valve configured to maintain the pressure (i.e., steam pressure) of the accommodation space in the inner pot 210 at a predetermined pressure by using a weight. The first pressure control device 140 may have a flow path communicating with the accommodation space in the inner pot 210 through the first lower steam hole 111H1 and the first upper steam hole 121H1, and may be configured to selectively discharge steam introduced into the flow path. The second pressure control device 150 may have a flow path communicating with the accommodation space in the inner pot 210 through the second lower steam hole 111H2 and the second upper steam hole 121H2, and may be configured to selectively discharge steam introduced into the flow path.

The first pressure control device 140 may be configured to form a first pressure higher than a reference pressure (e.g., atmospheric pressure) in the inner pot 210, and the second pressure control device 150 may be configured to form a second pressure higher than the first pressure in the inner pot 210. In exemplary embodiments, the first pressure may be between 1.2 $kgf/cm^2$ and 1.8 $kgf/cm^2$. For example, the first pressure may be 1.5 $kgf/cm^2$. In exemplary embodiments, the second pressure may be between 1.8 $kgf/cm^2$ and 2.4 $kgf/cm^2$. For example, the second pressure may be 2.1 $kgf/cm^2$.

The solenoid valve 160 may be mounted on the top plate 120. The solenoid valve 160 may be configured to adjust the pressure of the accommodation space in the inner pot 210 by discharging steam in the accommodation space in the inner pot 210 in response to an electrical control signal. The solenoid valve 160 may include an inner flow path communicating with the accommodation space in the inner pot 210 through the third lower steam hole 111H3 and the third upper steam hole 121H3 and may be configured to selectively open/close the inner flow path in response to an electrical control signal. For example, the solenoid valve 160 may be configured to quickly release the residual pressure in the inner pot 210 to the outside by opening the inner flow path when cooking is completed.

The locking structure 170 may be configured to move between a locking position of being locked to the flange portion 211 of the inner pot 210 and an unlocking position of being unlocked with respect to the flange portion 211 of the inner pot 210. Switching between the locking position and the unlocking position of the locking structure 170 may be configured to be performed in association with rotation of the rotation cover 130.

The locking structure 170 may be mounted on the top plate 120 and may include an engagement protrusion (177 in FIG. 8A) configured to be selectively engaged with the flange portion 211 of the inner pot 210. The locking position of the locking structure 170 may be a position where the engagement protrusion 177 of the locking structure 170 overlaps the flange portion 211 of the inner pot 210 in the vertical direction, and the unlocking position of the locking structure 170 may be a position where the engagement protrusion 177 of the locking structure 170 does not overlap the flange portion 211 of the inner pot 210 in the vertical direction. While cooking of the cooking ingredients contained in the inner pot 210 is in progress, the locking structure 170 is located at the locking position, and when the engagement protrusion 177 is fixed to the inner pot 210, the inner pot 210 and the inner pot cover 110 or the inner pot 210 and the top plate 120 can be firmly fixed to each other. The locking structure 170 will be described later in more detail with reference to FIGS. 7, 8A, and 8B.

Figure 4A:
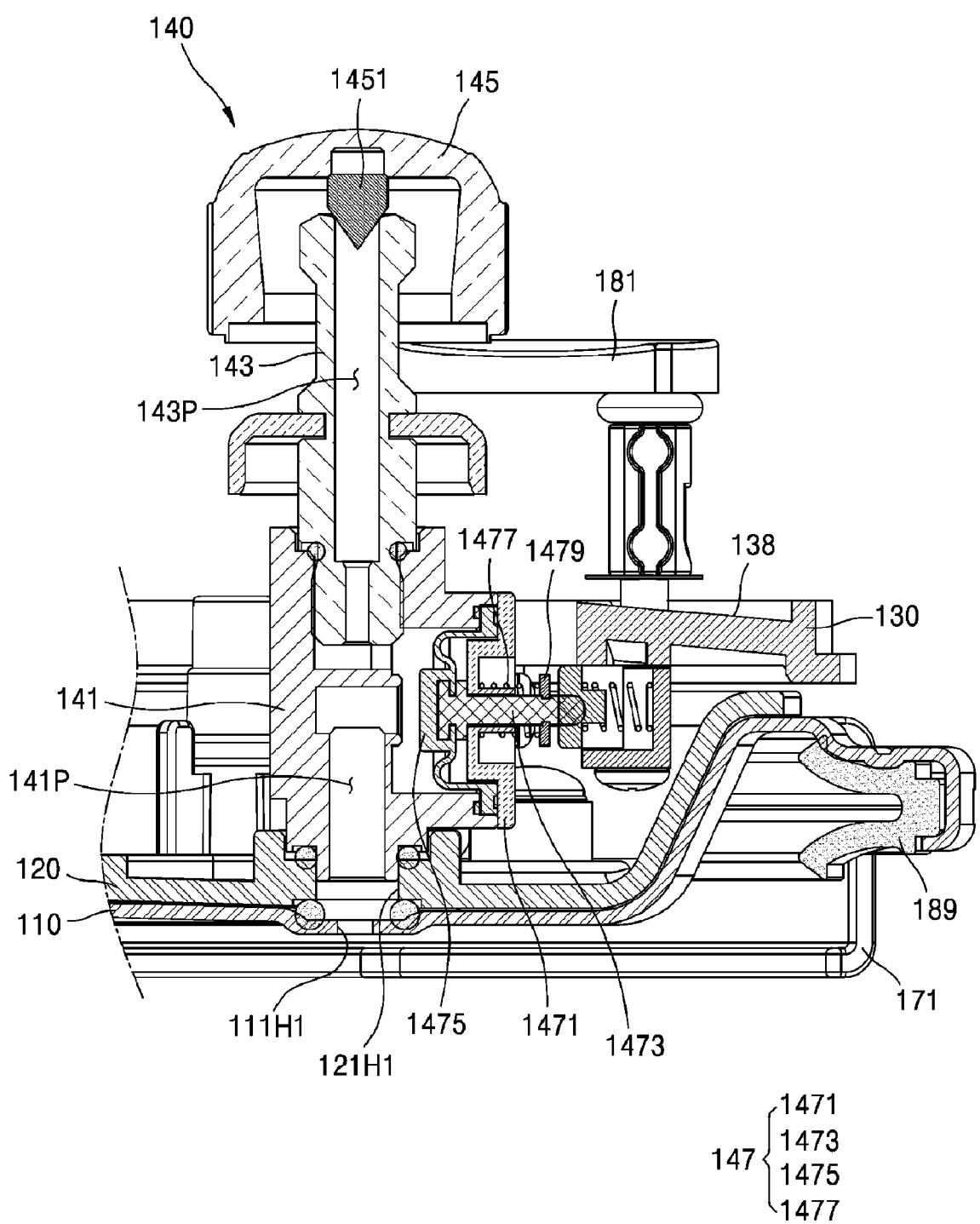
FIGS. 4A and 4B are cross-sectional views illustrating a portion of the lid assembly.
Figure 4B:
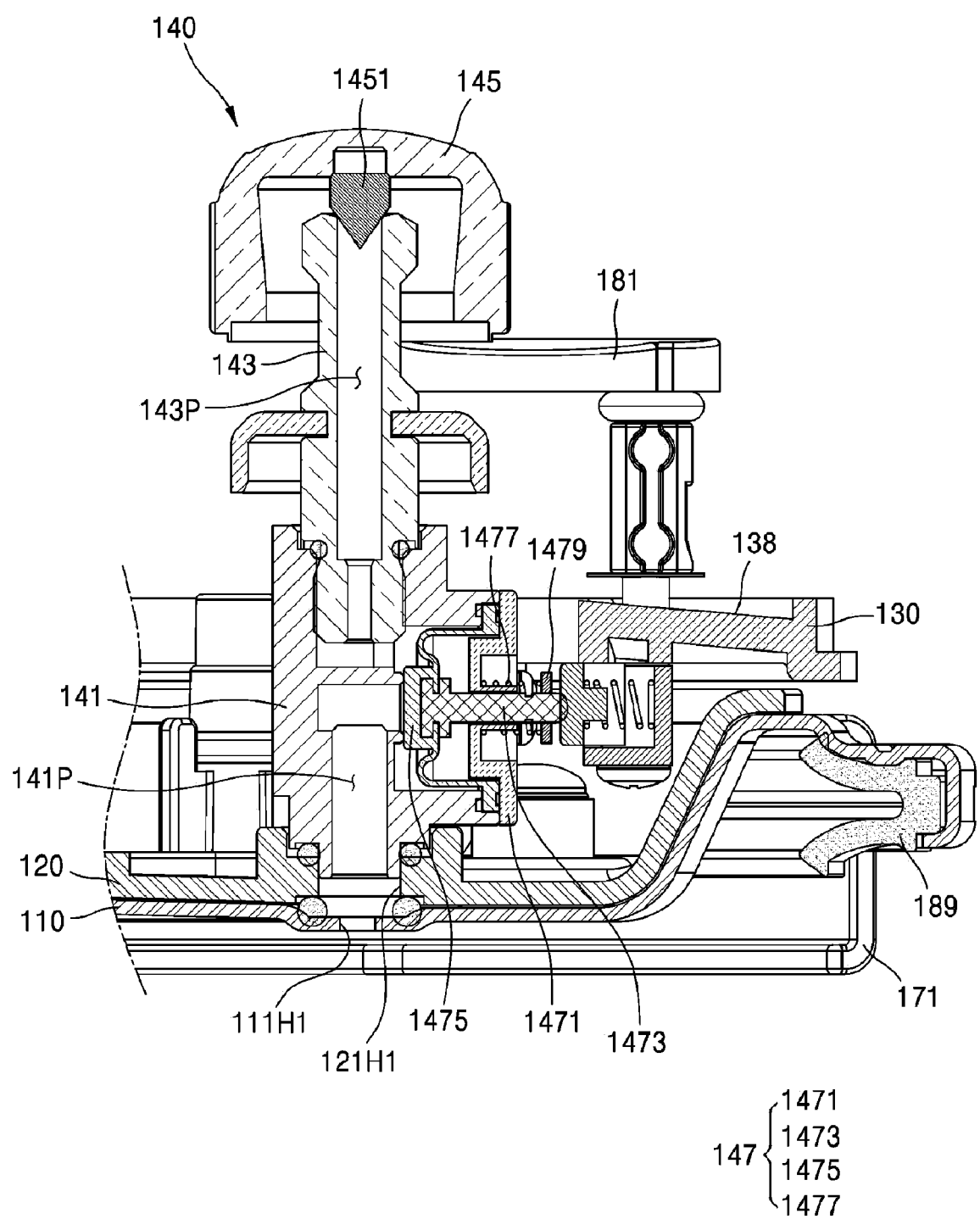
Figure 5A:
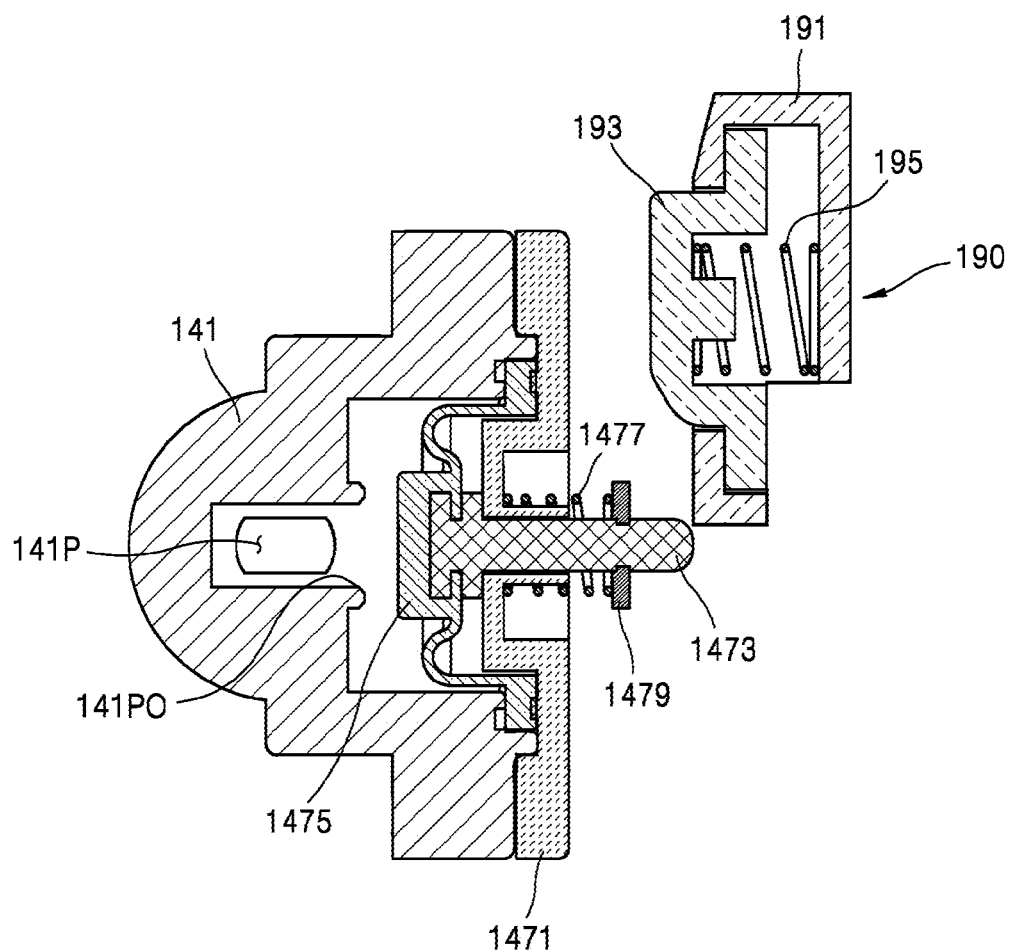
FIGS. 5A and 5B are conceptual views illustrating operations of a push structure and a shutter structure.
Figure 5B:
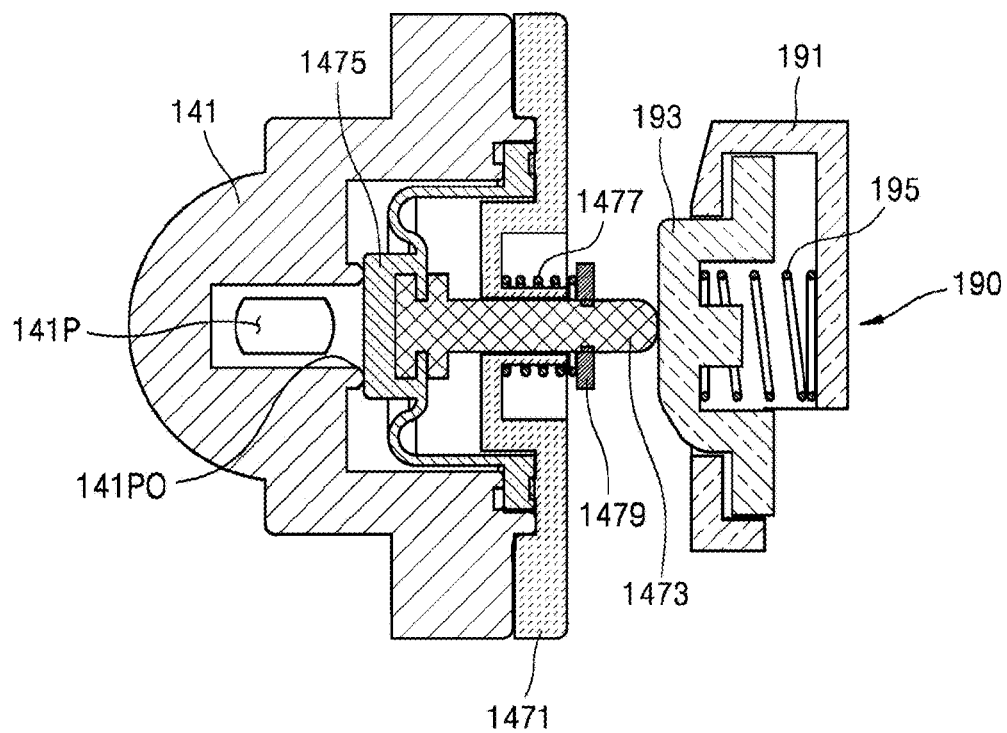

FIGS. 4A and 4B are cross-sectional views illustrating a portion of the lid assembly 100. FIGS. 5A and 5B are conceptual views illustrating operations of the push structure 190 and the shutter structure 147.

FIG. 4A illustrates a state when the shutter structure 147 is located at the opening position of the shutter structure 147 where the outlet 141PO of the first lower flow path 141P is opened, and FIG. 4B illustrates a state when the shutter structure 147 is located at the closing position of the shutter structure 147 where the outlet 141PO of the first lower flow path 141P is closed. FIG. 5A illustrates the state when the shutter structure 147 is located at the opening position corresponding to FIG. 4A, and FIG. 5B illustrates the state when the shutter structure 147 is located at the closing position corresponding to FIG. 4B.

Referring to FIGS. 1 to 5B, the first pressure control device 140 may include a first lower cylinder 141, a first upper cylinder 143, a first weight 145, and a shutter structure 147.

The first lower cylinder 141 may include a first lower flow path 141P communicating with the accommodation space in the inner pot 210. The first lower flow path 141P may communicate with the accommodation space in the inner pot 210 through the first upper steam hole 121H1 in the top plate 120 and the first lower steam hole 111H1 in the inner pot cover 110. The first lower flow path 141P may extend from an inlet communicating with the first upper steam hole 121H1 in the top plate 120 to the outlet 141PO exposed through one side surface of the first lower cylinder 141 facing the shutter structure 147.

The first upper cylinder 143 may be disposed on the first lower cylinder 141 and may include a first upper flow path 143P. The first upper flow path 143P may extend from an inlet formed at the bottom side of the first upper cylinder 143 to an outlet formed at the top side of the first upper cylinder 143.

The first weight 145 may be disposed on the first upper cylinder 143. The first weight 145 may include a first pressure protrusion 1451 configured to be inserted into the outlet of the first upper flow path 143P. The first pressure protrusion 1451 may open or close the outlet of the first upper flow path 143P depending on the level of the steam pressure formed in the first upper flow path 143P.

The shutter structure 147 may be configured to open/close the outlet 141PO of the first lower flow path 141P. The shutter structure 147 may be configured to switch between the opening position of opening the outlet 141PO of the first lower flow path 141P and the closing position of closing the outlet 141PO of the first lower flow path 141P. Switching between the opening position and the closing position of the shutter structure 147 may be implemented by the push structure 190 which will be described later. When the shutter structure 147 opens the outlet 141PO of the first lower flow path 141P, the first lower flow path 141P and the first upper flow path 143P may communicate with each other. When the shutter structure 147 closes the outlet 141PO of the first lower flow path 141P, the first lower flow path 141P and the first upper flow path 143P may not communicate with each other.

The shutter structure 147 may include a shutter frame 1471, a shutter rod 1473, an elastic cover 1475, and a first elastic body 1477.

The shutter frame 1471 may be coupled to the first lower cylinder 141 to form a flow path connecting the outlet 141PO of the first lower flow path 141P and the inlet of the first upper flow path 143P. The shutter rod 1473 may be movably mounted to the shutter frame 1471. The shutter rod 1473 may be inserted into a through hole in the shutter frame 1471 and may linearly move within a predetermined movement range. The first end portion of the shutter rod 1473 facing the outlet 141PO of the first lower flow path 141P may have a size larger than the diameter of the through hole in the shutter frame 1471. The elastic cover 1475 formed of a material having excellent elasticity, such as rubber, may be coupled to the first end portion of the shutter rod 1473. The elastic cover 1475 may cover the first end portion of the shutter rod 1473. The first elastic body 1477 may be configured to elastically support the shutter rod in the direction from the closing position of the shutter structure 147 toward the open position, that is, the direction in which the first end portion of the shutter rod 1473 moves away from the outlet 141PO of the first lower flow path 141P. That is, the shutter rod 1473 may be elastically biased to the opening position by the first elastic body 1477. For example, the first elastic body 1477 may be an elastic spring. The first elastic body 1477 may surround the outer periphery of the shutter rod 1473, and the first elastic body 1477 may be disposed between a fixed ring 1479 that is fixed to the shutter rod 1473 adjacent to the second end portion of the shutter rod 1473 and the outer surface of the shutter frame 1471. In this way, the switching between the opening position and the closing position of the shutter structure 147 is determined by the position of the shutter rod 1473, and thus, the opening position of the shutter structure 147 in this specification may refer to the opening position of the shutter rod 1473 that opens the outlet 141PO of the first lower flow path 141P, and the closing position of the shutter structure 147 may refer to the closing position of the shutter rod 1473 that closes the outlet 141PO of the first lower flow path 141P.

The push structure 190 may control the switching of the shutter structure 147 between the opening position and the closing position. The push structure 190 may apply an external force to the shutter structure 147 such that the shutter structure 147 is fixed at the closing position to close the outlet 141PO of the first lower flow path 141P. Alternatively, the push structure 190 may release the external force applied to the shutter structure 147 to switch the shutter structure 147 from the closing position to the opening position.

The push structure 190 may include a fixed body 191, a movable body 193, and a second elastic body 195.

The fixed body 191 may be coupled to the rotation cover 130, and may be configured to rotate together with the rotation cover 130 when the rotation cover 130 rotates. The movable body 193 may be movably mounted to the fixed body 191. For example, the movable body 193 may be mounted to the fixed body 191 to be movable in the radial direction of the rotation cover 130, and the movement range of the movable body 193 may be limited by the fixed body 191. The second elastic body 195 may be disposed between the movable body 193 and the fixed body 191 and may be configured to elastically support the movable body 193. The second elastic body 195 may be configured to elastically support the movable body 193 in a radially inward direction. The movable body 193 may be elastically supported by the second elastic body 195 to be capable of pressing the shutter rod 1473 such that the shutter rod 1473 moves in a direction from the opening position to the closing position.

The shutter rod 1473 of the shutter structure 147 may be located on the movement trajectory of the movable body 193 which rotates together with the rotation cover 130 when the rotation cover 130 rotates. As a result, depending on the rotation angle of the rotation cover 130, the shutter rod 1473 may be pressed against the push structure 190 to be located at the closing position or separated from the push structure 190 to be located at the opening position.

Hereinafter, a pressure control process by the first pressure control device 140 and the second pressure control device 150 will be described in detail.

As illustrated in FIGS. 4A and 5A, when the push structure 190 is located to be spaced apart from the shutter structure 147, the external force by the push structure 190 does not act on the shutter structure 147. Since the shutter rod 1473 of the shutter structure 147 is elastically biased to the opening position by the first elastic body 1477, the outlet 141PO of the first lower flow path 141P can be opened. At this time, since the outlet 141PO of the first lower flow path 141P is opened, it is possible for the steam generated in the accommodation space in the inner pot 210 to flow into the first upper flow path 143P through the first lower flow path 141P. When the steam pressure of the accommodation space in the inner pot 210 is lower than a predetermined first pressure, the outlet of the first upper flow path 143P may be closed by the first pressure protrusion 1451 of the first weight 145. When the steam pressure of the accommodation space in the inner pot 210 increases to the predetermined first pressure or a level close thereto, the first pressure protrusion 1451 of the first weight 145 is lifted by the steam pressure so that the outlet of the first upper flow path 143P is opened and the steam is discharged to the outside, and thereby the steam pressure of the accommodation space in the inner pot 210 can be maintained at the first pressure or a level close thereto.

As illustrated in FIGS. 4B and 5B, when the rotation cover 130 is rotated to a position where the push structure 190 is capable of pressing the shutter structure 147, the movable body 193 of the push structure 190 interferes with the shutter rod 1473 of the shutter structure 147, and the movable body 193 elastically supported by the second elastic body 195 applies an external force to the shutter rod 1473. The shutter rod 1473 is pressed by the push structure 190 to move from the opening position to the closing position, and the elastic cover 1475 coupled to the first end portion of the shutter rod 1473 is brought into close contact with and closes the outlet 141PO of the first lower flow path 141P. At this time, in order to ensure that the shutter rod 1473 can be fixed to the closing position by the external force applied to the shutter structure 147 by the push structure 190, the restoring force of the second elastic body 195 may be greater than the resultant force of the restoring force of the first elastic body 1477 and the force applied to the shutter rod 1473 by the steam pressure in the inner pot 210. Since the outlet 141PO of the first lower flow path 141P is closed, steam discharge through the first pressure control device 140 is disabled. While the outlet 141PO of the first lower flow path 141P is closed by the shutter structure 147, the steam in the accommodation space in the inner pot 210 may flow into the second flow path (151P in FIG. 6A) of the second cylinder (151 in FIG. 6A) of the second pressure control device 150 that communicates with the second lower steam hole 111H2 and the second upper steam hole 121H2. When the steam pressure of the accommodation space in the inner pot 210 increases beyond the first pressure to a second pressure or a level close to the second pressure, the second pressure protrusion (1551 in FIG. 6A) of the second weight (155 in FIG. 6A) is lifted by the steam pressure so that the outlet of the second flow path 151P can be opened and the steam is discharged to the outside, and thereby the steam pressure of the accommodation space in the inner pot 210 can be maintained at the second pressure or a level close thereto.

Figure 6A:
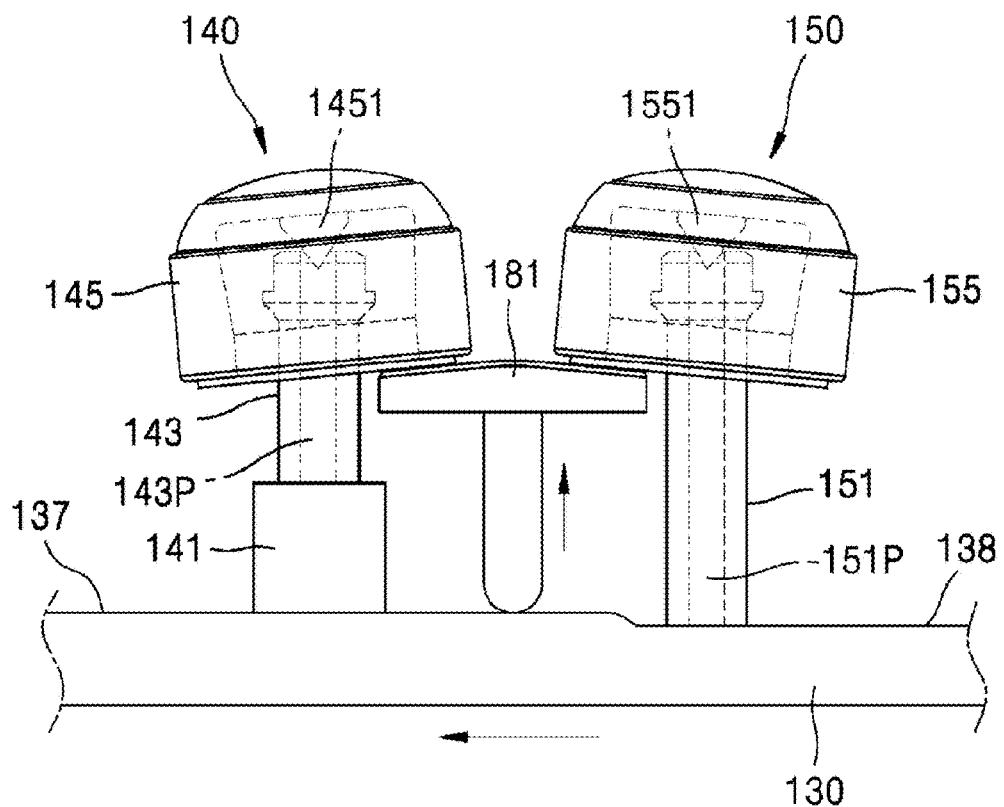
FIGS. 6A and 6B are cross-sectional views illustrating a portion of the lid assembly.
Figure 6B:
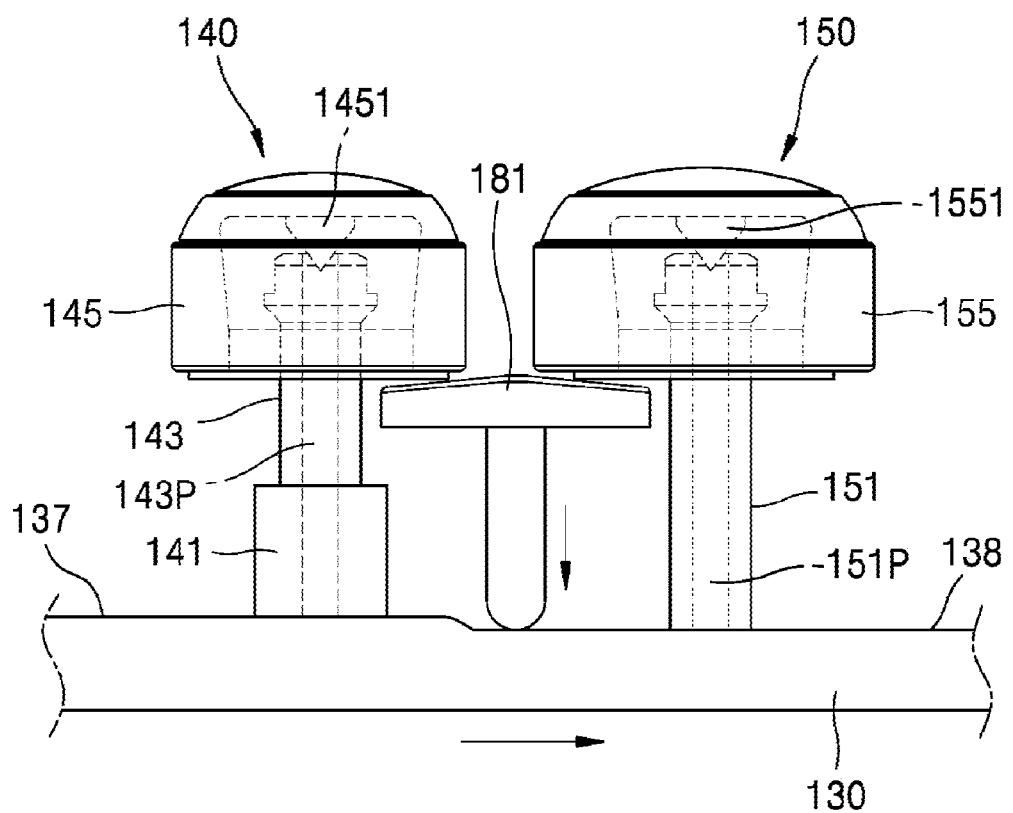

FIGS. 6A and 6B are side views illustrating a portion of the lid assembly 100, in which FIG. 6A illustrates a state when the lift pin 181 is located at the pin-up position, and FIG. 6B illustrates a state when the lift pin 181 is located at the pin-down position.

Referring to FIGS. 6A and 6B together with FIGS. 1 to 3, the cooking device 10 may include a lift pin 181 mounted to the lid cover 101 to be movable up and down. The lift pin 181 may be mounted to a through hole in the lid cover 101 to be movable, and the head of the lift pin 181 may protrude from the lid cover 101.

The lower end portion of the lift pin 181 may come into contact with the rotation cover 130, and may be configured to come into sliding contact with the surface of the rotation cover 130 during the rotation of the rotation cover 130. The lift pin 181 may move up and down in association with the rotation of the rotation cover 130. As illustrated in FIG. 6A, when the lift pin 181 is supported on a first surface portion 137 of the rotation cover 130 at a first height level, the lift pin 181 may be located at the pin-up position. As illustrated in FIG. 6B, when the lift pin 181 is supported on a second surface portion 138 of the rotation cover 130 at a second height level lower than the first height level, the lift pin 181 may be located at the pin-down position. For example, while the rotation cover 130 rotates in a first rotation direction, the contact position between the lift pin 181 and the rotation cover 130 may shift from the first surface portion 137 of the rotation cover 130 to the second surface portion 138, and the lift pin 181 may move down from the pin-up position to the pin-down position. Conversely, while the rotation cover 130 rotates in a second rotation direction, the contact position between the lift pin 181 and the rotation cover 130 may move from the second surface portion 138 of the rotation cover 130 to the first surface portion 137, and the lift pin 181 may move up from the pin-down position to the pin-up position.

As illustrated in FIG. 6A, at the pin-up position of the lift pin 181, the lift pin 181 is able to lift the first weight 145 of the first pressure control device 140 and the second weight 155 of the second pressure control device 150 together. When the first weight 145 and the second weight 155 are lifted by the lift pin 181, the outlet of the first upper flow path 143P in the first pressure control device 140 and the outlet of the second flow path 151P in the second pressure control device 150 can be forcibly opened regardless of the steam pressure level of the accommodation space in the inner pot 210. When the outlet of the first upper flow path 143P and the outlet of the second flow path 151P are forcibly opened by the lift pin 181, the steam in the accommodation space in the inner pot 210 can be discharged to the outside through the first pressure control device 140 and the second pressure control device 150, and while cooking is in progress in the cooking device 10, the steam pressure in the accommodation space in the inner pot 210 can be maintained at atmospheric pressure or a level close thereto.

As illustrated in FIG. 6B, at the pin-down position of the lift pin 181, the lift pin 181 may be spaced apart from the first weight 145 and the second weight 155. Here, the cases where the lift pin 181 is spaced apart from the first weight 145 and the second weight 155 may include: a case where the lift pin 181 is spaced apart from the first weight 145 and/or the second weight 155 by a predetermined distance and does not physically contact the first weight 145 and/or the second weight 155, and a case where the lift pin 181 is in physical contact with the first weight 145 and/or the second weight 155 but an external force sufficient to lift the first weight 145 and/or the second weight 155 is not provided by the lift pin 181. At the pin-down position of the lift pins 181, the steam discharge by the first pressure control device 140 and the second pressure control device 150 may be determined by the steam pressure level of the accommodation space in the inner pot 210 and/or the shutter structure 147.

Figure 7:
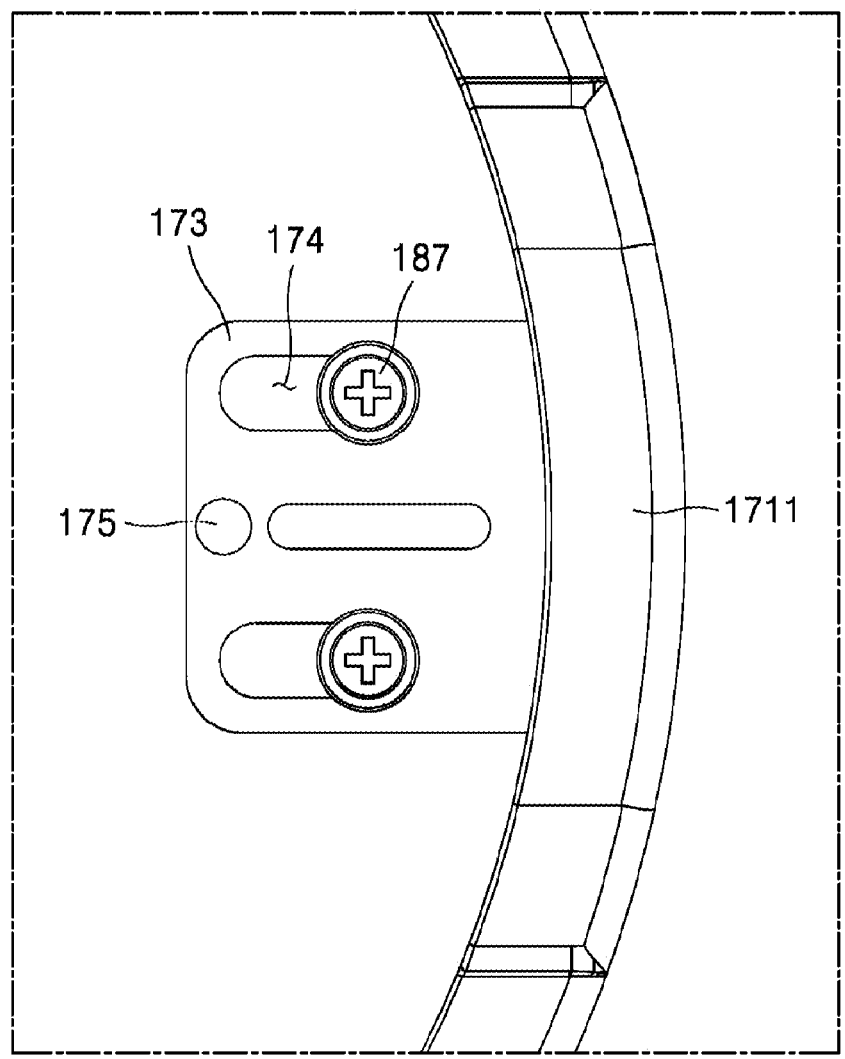
FIG. 7 is a plan view illustrating a locking structure.
Figure 8A:
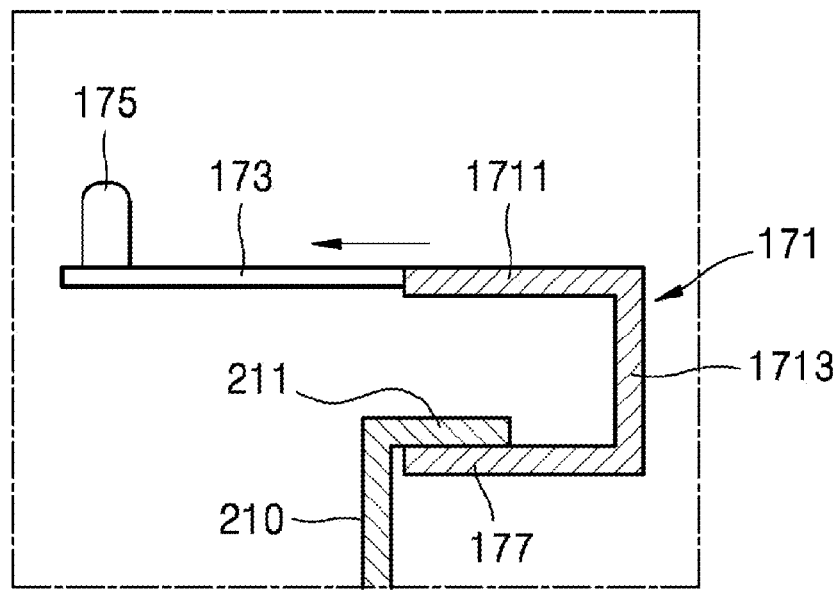
FIGS. 8A and 8B are cross-sectional views illustrating an operation of the locking structure according to the movement of a rotation cover.
Figure 8B:
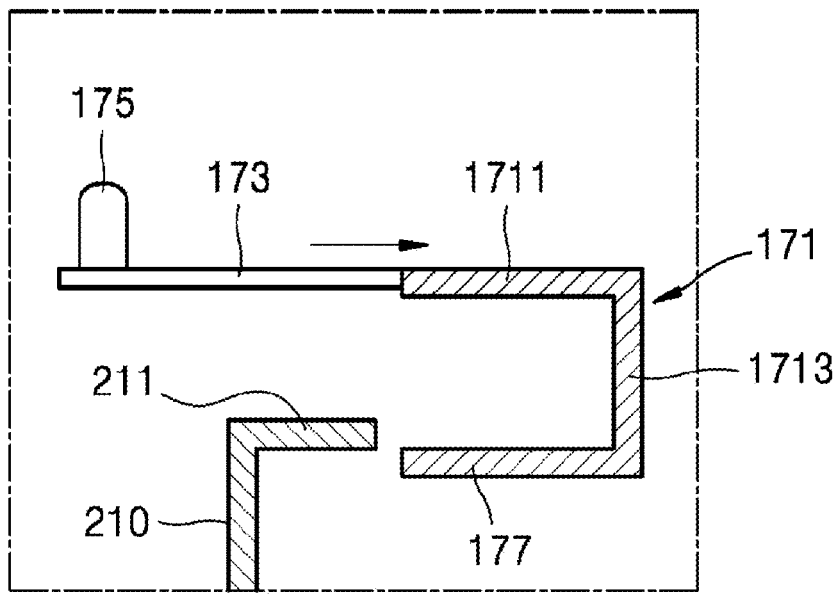
Figure 9:
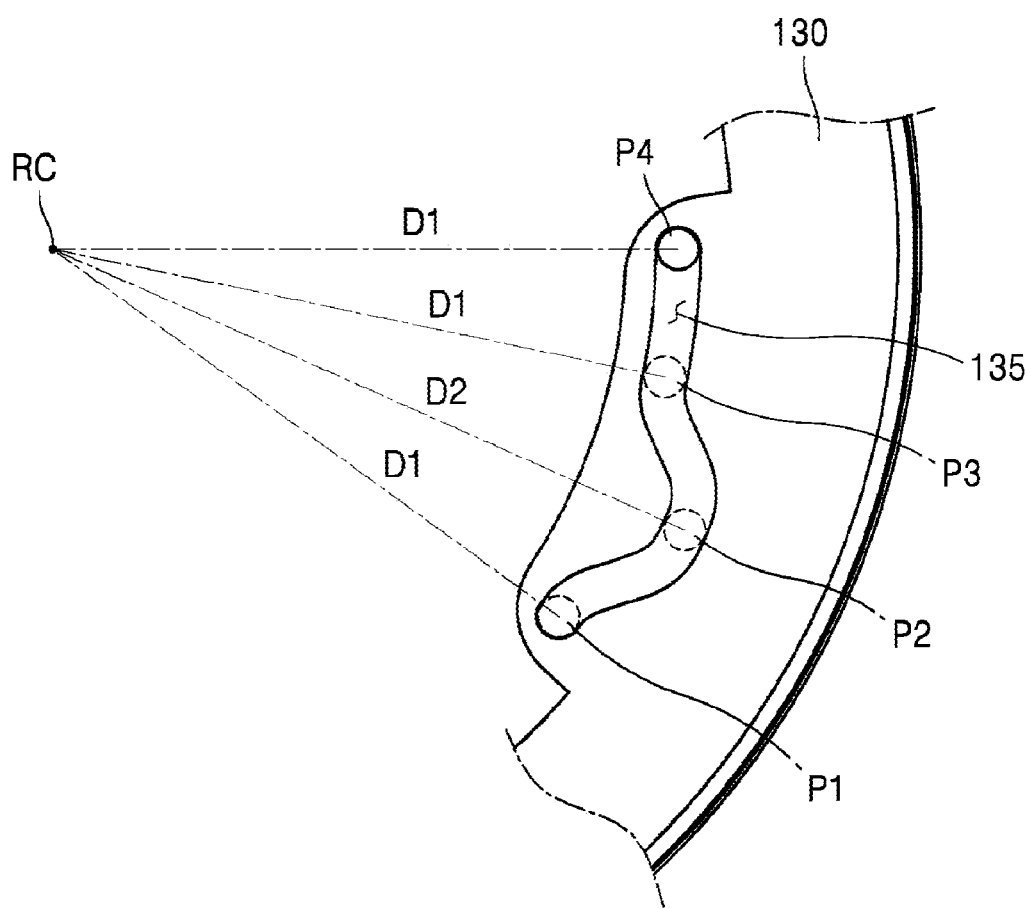
FIG. 9 is a plan view illustrating a portion of the rotation cover.

FIG. 7 is a plan view illustrating the locking structure 170. FIGS. 8A and 8B are cross-sectional views illustrating an operation of the locking structure 170 according to the rotation of the rotation cover 130, in which FIG. 8A illustrates the state when the locking structure 170 is located at the locking position, and FIG. 8B illustrates the state when the locking structure 170 is located at the unlocking position. FIG. 9 is a plan view illustrating a portion of the rotation cover 130.

Referring to FIGS. 7, 8A, 8B, and 9 together with FIGS. 1 to 3, the locking structure 170 may include a locking blade 171 extending along the edge of the top plate 120 and having a curved shape in a plan view. The locking blade 171 may include a side wall portion 1713 surrounding the edge of the top plate 120 and the edge of the inner pot cover 110 in a lateral direction, an upper body 1711 extending inward from the upper end of the side wall portion 1713 and engaged with the edge portion of the top surface of the top plate 120, and a lower body extending inward from the lower end of the side wall portion 1713. The lower body of the locking blade 171 may include an engagement protrusion 177 configured to be fixedly engaged with the flange portion 211 of the inner pot 210.

The locking structure 170 may include a connection plate 173 connected to the inner periphery of the upper end portion of the locking blade 171 and disposed between the top plate 120 and the rotation cover 130. The connection plate 173 may include a groove 174 extending in a linear direction. The groove 174 of the connection plate 173 may guide the linear movement of the locking structure 170 as well as limiting the movement range of the locking structure 170. More specifically, a fastening structure 187 such as a screw may be inserted into a boss 123 of the top plate 120 through the groove 174 of the connection plate 173. The linear movement of the locking structure 170 may be limited between a position where the fastening structure 187 is located at one end of the groove 174 and a position where the fastening structure 187 is located at the other end of the groove 174.

The rotation cover 130 may include a guide groove 135 extending generally along the rotation direction of the rotation cover 130, and the connection plate 173 of the locking structure 170 may include a guide protrusion 175 configured to be inserted into the guide groove 135 of the rotation cover 130. While the rotation cover 130 rotates, the linear movement of the locking structure 170 may be implemented by physical interference between the rotation cover 130 and the guide protrusion 175 accommodated in the guide groove 135.

In exemplary embodiments, as illustrated in FIG. 9, the guide groove 135 may include a first position P1, a second position P2, a third position P3, and a fourth position P4 which are sequentially disposed between one end and the other end of the guide groove 135 along the extending direction of the guide groove 135. The first position P1, the third position P3, and the fourth position P4 of the guide groove 135 may be spaced apart from the rotation center RC of the rotation cover 130 by a first distance D1, and the second position P2 of the guide groove 135 may be spaced apart from the rotation center RC of the rotation cover 130 by a second distance D2 greater than the first distance D1.

Depending on the rotation angle of the rotation cover 130, the relative position of the guide protrusion 175 with respect to the guide groove 135 varies. When the guide protrusion 175 is located at the first position P1, the third position P3, and the fourth position P4 of the guide groove 135, which are spaced apart from the rotation center RC of the rotation cover 130 by substantially the same first distance D1, the locking structure 170 may be located at a locking position where the engagement protrusion 177 can be engaged with the flange portion 211 of the inner pot 210. When the guide protrusion 175 is located at the second position P2 of the guide groove 135 spaced apart from the rotation center RC of the rotation cover 130 by the second distance D2 greater than the first distance D1, the locking structure 170 may be located at the unlocking position spaced radially outward from the locking position. That is, while the guide protrusion 175 moves from the first position P1 of the guide groove 135 toward the second position P2 and from the third position P3 of the guide groove 135 to the second position P2, the locking structure 170 moves outward in the radial direction. Conversely, while the guide protrusion 175 moves from the second position P2 of the guide groove 135 toward the first position P1 and from the second position P2 of the guide groove 135 to the third position P3, the locking structure 170 moves inward in the radial direction.

FIG. 10 is a plan view illustrating the manipulation handle 183 of the lid assembly 100.

Referring to FIGS. 9 and 10 together with FIGS. 1 to 3, the manipulation handle 183 is rotatable between the first rotation position, the second rotation position, the third rotation position, and the fourth rotation position which are sequentially spaced apart from each other in a first rotation direction. The first to fourth rotation positions of the manipulation handle 183 may be defined as rotation angles at which the manipulation handle 183 is rotated with reference to an arbitrary reference position. For example, the first rotation position of the manipulation handle 183 may be a position where an alignment protrusion 1831 of the manipulation handle 183 is aligned with a first marker 188a provided on the lid cover 101, the second rotation position of the manipulation handle 183 may be a position where the alignment protrusion 1831 of the manipulation handle 183 is aligned with a second marker 188b provided on the lid cover 101, the third rotation position of the manipulation handle 183 may be a position where the alignment protrusion 1831 of the manipulation handle 183 is aligned with a third marker 188c provided on the lid cover 101, and the fourth rotation position of the manipulation handle 183 may be a position where the alignment protrusion 1831 of the manipulation handle 183 is aligned with the fourth marker 188d provided on the lid cover 101.

As described above, since the rotation cover 130 rotates in association with the rotation of the manipulation handle 183, the rotation cover 130 rotates as the manipulation handle 183 rotates, and the relative position of the guide protrusion 175 with respect to the guide groove 135 may vary. When the manipulation handle 183 is located at the first rotation position, the guide protrusion 175 may be located at the first position P1 of the guide groove 135, when the manipulation handle 183 is located at the second rotation position, the guide protrusion 175 may be located at the second position P2 of the guide groove 135, when the manipulation handle 183 is located at the third rotation position, the guide protrusion 175 may be located at the third position P3 of the guide groove 135, and when the manipulation handle 183 is located at the fourth rotation position, the guide protrusion 175 may be located at the fourth position P4 of the guide groove 135.

FIGS. 11A, 11B, 11C and 11D illustrate plan views each showing an operating state of the lid assembly 100 depending on a rotation angle of the rotation cover 130. FIG. 12 is a table representing the change in the position of the guide protrusion 175, the operation of the locking structure 170, the operation of the lift pin 181, the operation of the shutter structure 147, and the change in the pressure of the inner pot 210 depending on the change in the rotation position of the manipulation handle 183.

Hereinafter, a method of operating the cooking device 10 including the lid assembly 100 will be described with reference to FIGS. 1 to 12.

Figure 11A:
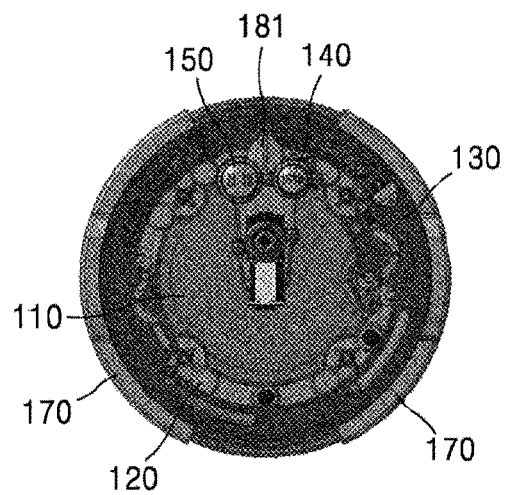
FIGS. 11A, 11B, 11C and 11D illustrate plan views each illustrating an operating state of the lid assembly depending on a rotation angle of the rotation cover.

FIG. 11A is a plan view illustrating the main components of the lid assembly 100 when the manipulation handle 183 is located at the first rotation position.

As illustrated in FIG. 11A, when the manipulation handle 183 is located at the first rotation position, the guide protrusion 175 is located at the first position P1 of the guide groove 135. Therefore, as illustrated in FIG. 8A, the locking structure 170 is located at the locking position where the engagement protrusion 177 of the locking structure 170 is engaged with the flange portion 211 of the inner pot 210.

When the manipulation handle 183 is located at the first rotation position, since the lift pin 181 supported on the first surface portion 137 of the first rotation cover 130 is raised to the pin-up position as illustrated in FIG. 6A, the outlet of the first upper flow path 143P in the first pressure control device 140 and the outlet of the second flow path 151P in the second pressure control device 150 are forcibly opened, and the shutter structure 147 is located at the opening position of opening the outlet 141PO of the first lower flow path 141P as illustrated in FIG. 4A. Accordingly, while cooking is in progress, since the steam generated in the accommodation space in the inner pot 210 escapes to the outside through the first pressure control device 140 and the second pressure control device 150, the pressure of the accommodation space in the inner pot 210 can be maintained at no pressure (e.g., atmospheric pressure or a pressure close thereto).

Figure 11B:
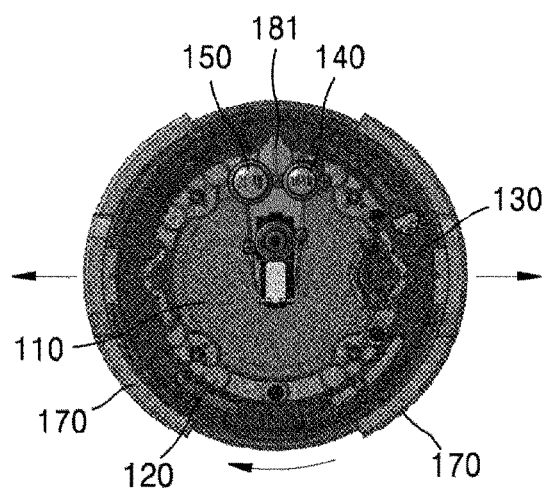

FIG. 11B is a plan view illustrating the main components of the lid assembly 100 when the manipulation handle 183 is located at the second rotation position.

As illustrated in FIGS. 11A and 11B, when the manipulation handle 183 is switched from the first rotation position to the second rotation position, the guide protrusion 175 may move from the first position P1 to the second position P2 of the guide groove 135, and the locking structure 170 may move outward in the radial direction to be located at the unlocking position, as illustrated in FIG. 8B. Since the engagement protrusion 177 is not engaged with the inner pot 210 at the unlocking position of the locking structure 170, rotation for opening the lid assembly 100 is possible. Accordingly, when the manipulation handle 183 is located at the second rotation position, it is possible to open the lid assembly 100 and to perform tasks such as introducing cooking ingredients and checking the cooking state.

When the manipulation handle 183 is located at the second rotation position, as in the case where the manipulation handle 183 is located at the first rotation position, the lift pin 181 is located at the pin-up position and the shutter structure 147 is located at the opening position. Accordingly, while cooking is in progress, since the steam generated in the accommodation space in the inner pot 210 escapes to the outside through the first pressure control device 140 and the second pressure control device 150, the pressure of the accommodation space in the inner pot 210 can be maintained at no pressure.

Figure 11C:
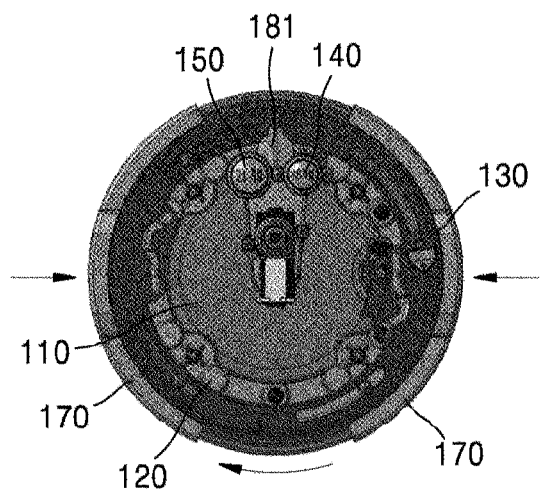

FIG. 11C is a plan view illustrating the main components of the lid assembly 100 when the manipulation handle 183 is located at the third rotation position.

As illustrated in FIGS. 11B and 11C, when the manipulation handle 183 is switched from the second rotation position to the third rotation position, the guide protrusion 175 may move from the second position P2 to the third position P3 of the guide groove 135, and the locking structure 170 may move inward in the radial direction to be located at the locking position, as illustrated in FIG. 8A.

When the manipulation handle 183 is located at the third rotation position, as illustrated in FIG. 6B, the lift pin 181 supported on the second surface portion 138 of the first rotation cover 130 is lowered to the pin-down position, and as illustrated in FIG. 4A, the shutter structure 147 is located at the opening position of opening the outlet 141PO of the first lower flow path 141P. Accordingly, while cooking is in progress, the steam generated in the accommodation space in the inner pot 210 flows to the first lower flow path 141P and the first upper flow path 143P in the first pressure control device 140 which communicate with each other, and the pressure of the accommodation space in the inner pot 210 may be determined by the first pressure control device 140. That is, since the steam is discharged to the outside through the first pressure control device 140 when the steam pressure in the accommodation space in the inner pot 210 is increased to a predetermined first pressure or a level close thereto, the pressure of the accommodation space in the inner pot 210 can be maintained at the first pressure or a level close thereto.

Figure 11D:
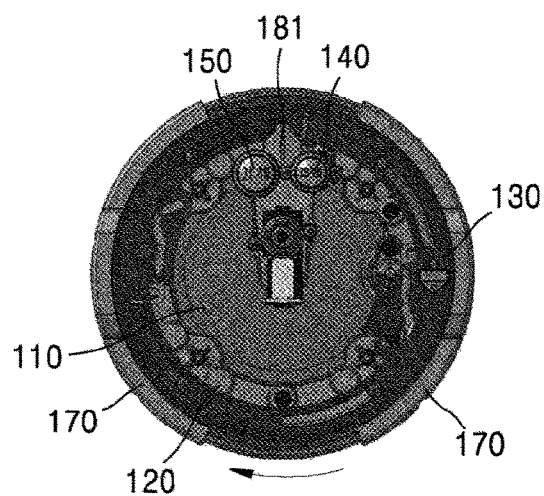

FIG. 11D is a plan view illustrating the main components of the lid assembly 100 when the manipulation handle 183 is located at the fourth rotation position.

As illustrated in of FIGS. 11C and 11D, when the manipulation handle 183 is switched from the third rotation position to the fourth rotation position, the guide protrusion 175 may move from the third position P3 to the fourth position P4 of the guide groove 135, and the locking structure 170 may be located at the locking position as in the case where the manipulation handle 183 is located at the third rotation position.

When the manipulation handle 183 is located at the fourth rotation position, the lift pin 181 is located at the pin-down position as illustrated in FIG. 6B, and the shutter structure 147 is located at the closing position of closing the outlet 141PO of the first lower flow path 141P as illustrated in FIG. 4B. Accordingly, since the discharge of steam through the first pressure control device 140 is disabled while cooking is in progress, the steam generated in the accommodation space in the inner pot 210 flows into the second flow path 151P in the second pressure control device 150, and the pressure of the accommodation space in the inner pot 210 can be determined by the second pressure control device 150. That is, since the steam is discharged to the outside through the second pressure control device 150 when the steam pressure in the accommodation space in the inner pot 210 is increased to a predetermined second pressure or a level close thereto, the pressure of the accommodation space in the inner pot 210 can be maintained at the second pressure or a level close thereto.

According to exemplary embodiments of the present disclosure, the cooking device 10 provides various pressure cooking modes, for example, a non-pressure cooking mode (or low-pressure cooking mode) for cooking with no pressure, a first pressure cooking mode for cooking with the first pressure, and a second high-pressure cooking mode with the second pressure, it is possible to conduct cooking according to cooking ingredients and a user's taste. Accordingly, user convenience and cooking quality can be improved.

Figure 13:
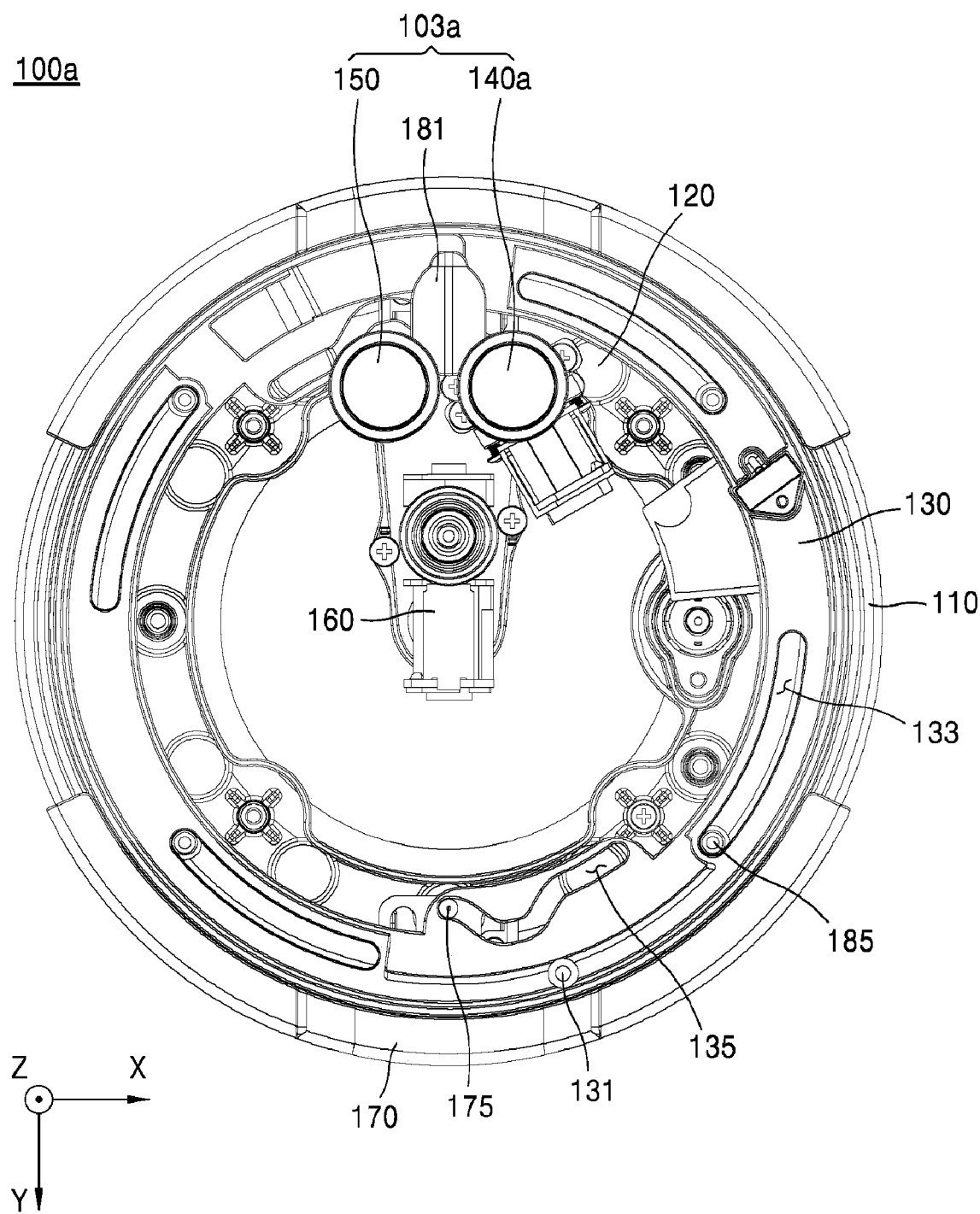
FIG. 13 is a plan view illustrating main components of a lid assembly of a cooking device according to exemplary embodiments of the present disclosure.
Figure 14A:
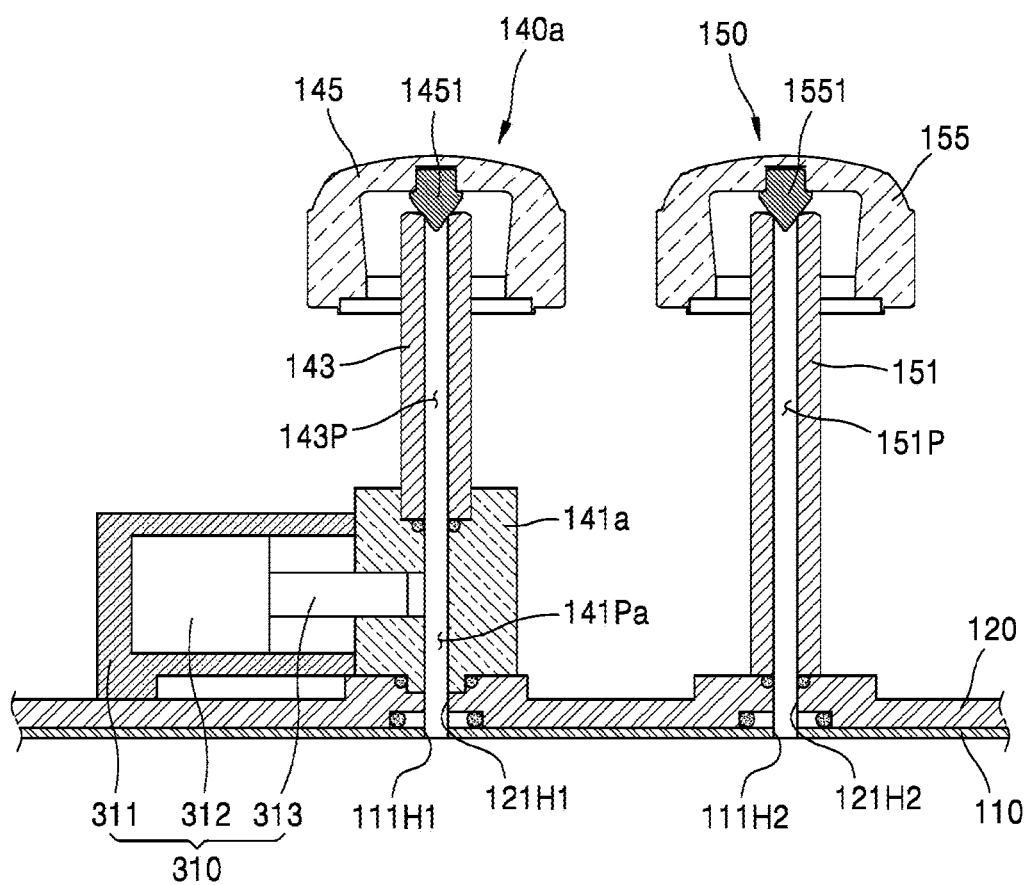
FIGS. 14A and 14B are cross-sectional views illustrating a pressure control device of the lid assembly of FIG. 13.
Figure 14B:
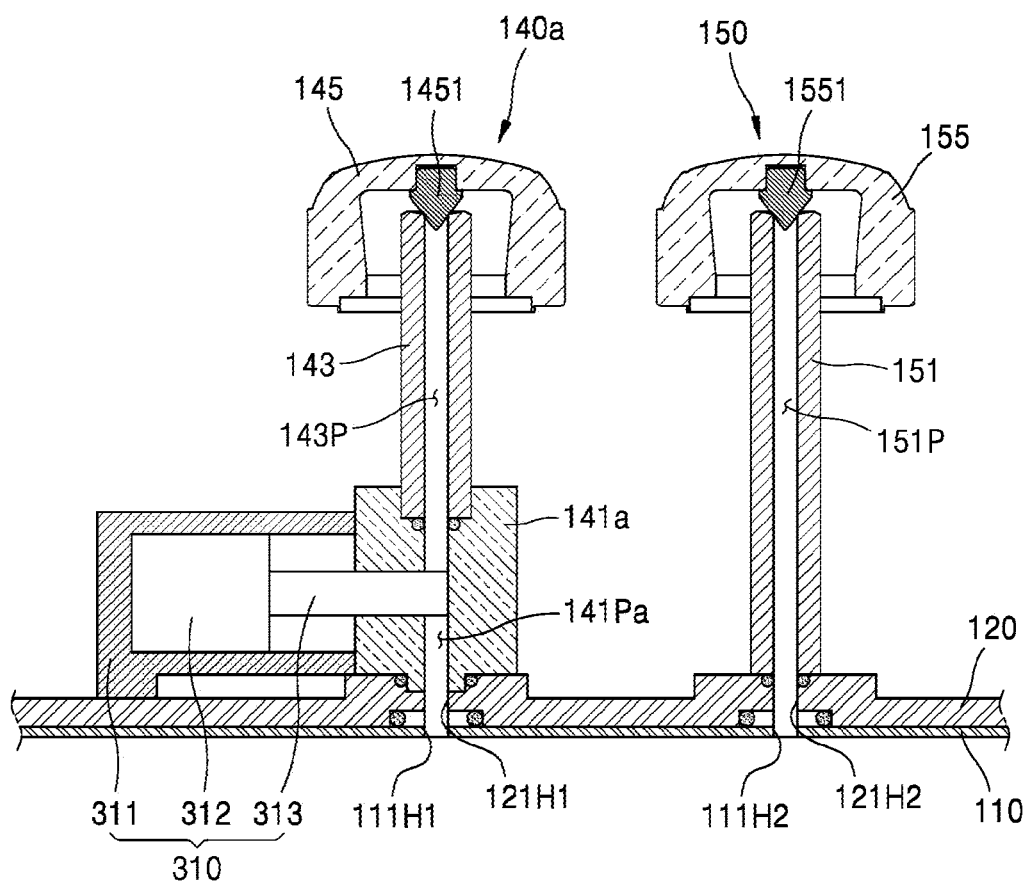

FIG. 13 is a plan view illustrating the main components of a lid assembly 100a of a cooking device according to exemplary embodiments of the present disclosure. FIGS. 14A and 14B are cross-sectional views illustrating a pressure control device 103a of the lid assembly 100a of FIG. 13.

FIG. 14A shows a state when a shutter structure 310 is located at an opening position where the shutter structure 310 opens a first lower flow path 141Pa, and FIG. 14B illustrates a state when the shutter structure 310 is located at a closing position where the shutter structure 310 closes the first lower flow path 141Pa.

The lid assembly 100a illustrated in FIGS. 13, 14A, and 14B may be substantially similar to the lid assembly 100 described with reference to FIGS. 1 to 12, except for the fact that the push structure (see 190 in FIG. 3) is omitted, the difference in configuration and operation of the first pressure control device 140a, and the like. Hereinafter, the lid assembly 100a illustrated in FIGS. 13, 14A, and 14B and a cooking device including the same will be described, focusing on differences from the lid assembly 100 described with reference to FIGS. 1 to 12 and the cooking device 10 including the same.

Referring to FIGS. 13, 14A, and 14B, the pressure control device 103a may include a first pressure control device 140a configured to form a first pressure in the accommodation space in the inner pot 210, and a second pressure control device 150 configured to form a second pressure higher than the first pressure in the accommodation space in the pot 210.

The first pressure control device 140a may be an electronically controlled valve that controls whether steam is discharged in response to an electrical control signal. The first pressure control device 140a may include a first cylinder including a first lower cylinder 141a and a first upper cylinder 143 connected in a vertical direction, a first weight 145, and a shutter structure 310.

The first lower cylinder 141a may include a first lower flow path 141Pa communicating with the accommodation space in the inner pot 210. The first lower flow path 141Pa may communicate with the accommodation space in the inner pot 210 through the first upper steam hole 121H1 in the top plate 120 and the first lower steam hole 111H1 in the inner pot cover 110. The first lower flow path 141Pa may extend upward from an inlet communicating with the first upper steam hole 121H1 in the top plate 120 to an outlet provided at the upper side of the first lower cylinder 141a.

The first upper cylinder 143 may be disposed on the first lower cylinder 141a and may include a first upper flow path 143P communicating with the first lower flow path 141Pa. The first upper flow path 143P may extend upward from an inlet communicating with the outlet of the first lower cylinder 141a to an outlet provided at the upper side of the first upper cylinder 143.

The first weight 145 may be disposed on the first upper cylinder 143. The first weight 145 may include a first pressure protrusion 1451 configured to be inserted into the outlet of the first upper flow path 143P. The first pressure protrusion 1451 may open/close the outlet of the first upper flow path 143P depending on the level of the steam pressure formed in the first upper flow path 143P.

The shutter structure 310 may be configured to control steam discharge through the first pressure control device 140a. The shutter structure 310 may be configured to open/close the first lower flow path 141Pa. The shutter structure 310 may be configured to switch between an opening position of opening the first lower flow path 141Pa and a closing position of closing the first lower flow path 141Pa.

The shutter structure 310 may include a frame 311 mounted on the top plate 120 and a shutter rod 313 movably mounted to the frame 311. The shutter rod 313 may be connected to an actuator 312 such as a motor, and the movement of the shutter rod 313 may be controlled by the actuator 312.

As illustrated in FIG. 14B, at the closing position of the shutter structure 310, at least a portion of the shutter rod 313 may be inserted into the middle portion of the first lower flow path 141Pa to close the first lower flow path 141Pa. In this case, since the first lower flow path 141Pa is closed, and steam discharge through the first pressure control device 140a may be disabled. As illustrated in FIG. 14A, in the opening position of the shutter structure 310, the shutter rod 313 may be located at a position retracted from the closing position of the shutter structure 310 so that the first lower flow path 141Pa is not blocked. In this way, the switching between the opening position and the closing position of the shutter structure 310 is determined by the position of the shutter rod 313, and thus, the opening position of the shutter structure 310 may refer to the opening position of the shutter rod 313 that opens the first lower flow path 141Pa, and the closing position of the shutter structure 310 may refer to the closing position of the shutter rod 313 that closes the first lower flow path 141Pa.

In exemplary embodiments, the cooking device may include a detector configured to detect the rotation position of the manipulation handle (183 in FIG. 10) and/or the rotation position of the rotation cover 130, and a controller configured to generate a control signal to be applied to the first pressure control device 140a based on the information detected by the detector. The detector may include a sensor, such as a reed switch, an optical sensor, or a mechanical sensor. The controller may include a microcontroller chip and may be mounted on the main body (200 in FIG. 1).

The detector may be configured to detect the rotation position of the manipulation handle 183 and/or the rotation position of the rotation cover 130. Alternatively, the detector may be configured to detect a change in the position of the guide protrusion 175 in the guide groove 135 that varies according to the rotation of the rotation cover 130 and/or a change in the position of the fastening structure 185 in the rotation restriction groove 133 that varies according to the rotation of the rotation cover 130.

The controller generates a first control signal for placing the shutter structure 310 at the opening position and a second control signal for placing the shutter structure 310 at the closing position, based on the information detected by the detector.

Hereinafter, a pressure control process by the pressure control device 103a will be described in more detail.

As illustrated in FIG. 14A, the controller may apply a first control signal to the actuator 312 connected to the shutter rod 313 to position the shutter rod 313 at the opening position. At the opening position of the shutter rod 313, the first lower flow path 141Pa and the first upper flow path 143P communicate with each other, and the steam generated in the accommodation space in the inner pot 210 flows into the upper flow path 143P through the first lower flow path 141Pa. When the steam pressure of the accommodation space in the inner pot 210 is lower than the predetermined first pressure, the outlet of the first upper flow path 143P may be closed by the first pressure protrusion 1451 of the first weight 145. When the steam pressure of the accommodation space in the inner pot 210 increases to the predetermined first pressure or a level close thereto, the first pressure protrusion 1451 of the first weight 145 is lifted by the steam pressure so that the outlet of the first upper flow path 143P can be opened, and while the steam is discharged to the outside, the steam pressure of the accommodation space in the inner pot 210 can be maintained at the first pressure or a level close thereto.

As illustrated in FIG. 14B, the controller of the cooking device may apply a second control signal to the actuator 312 connected to the shutter rod 313 to position the shutter rod 313 at the closing position. In response to the second control signal provided from the controller, the shutter rod 313 may move to the closing position of closing the first lower flow path 141Pa. Since the first lower flow path 141Pa is closed by the shutter rod 313, steam discharge through the first pressure control device 140a is disabled. While the first lower flow path 141Pa is closed by the shutter structure 310, the steam in the accommodation space in the inner pot 210 may flow into the second flow path 151P in the second cylinder 151 that communicates with the second lower steam hole 111H2 and the second upper steam hole 121H2. When the steam pressure of the accommodation space in the inner pot 210 increases beyond the first pressure to a second pressure or a level close thereto, the second pressure protrusion 1551 of the second weight 155 is lifted by the steam pressure so that the outlet of the second flow path 151P can be opened, and while the steam is discharged to the outside, the steam pressure of the accommodation space in the inner pot 210 can be maintained at the second pressure or a level close thereto.

Figure 15A:
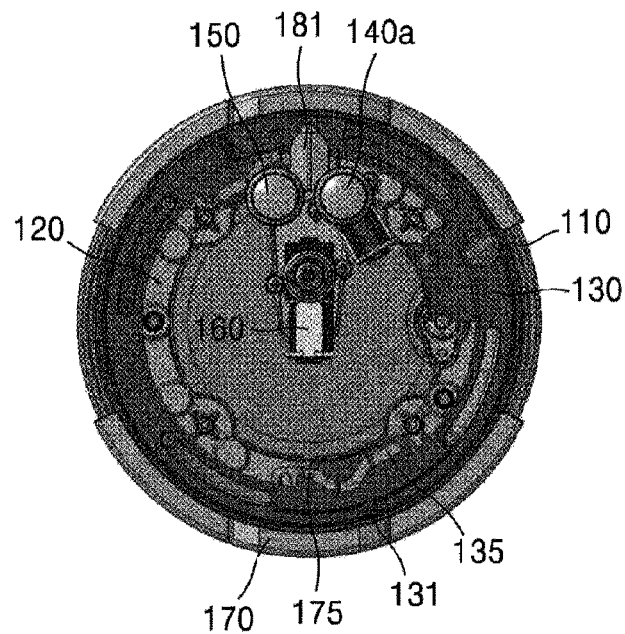
FIGS. 15A, 15B and 15C illustrate plan views each illustrating an operating state of the lid assembly depending on a rotation angle of the rotation cover.
Figure 15B:
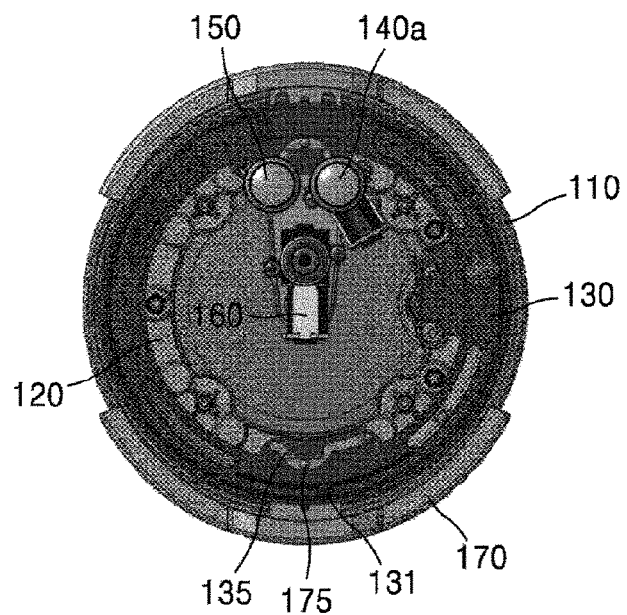
Figure 15C:
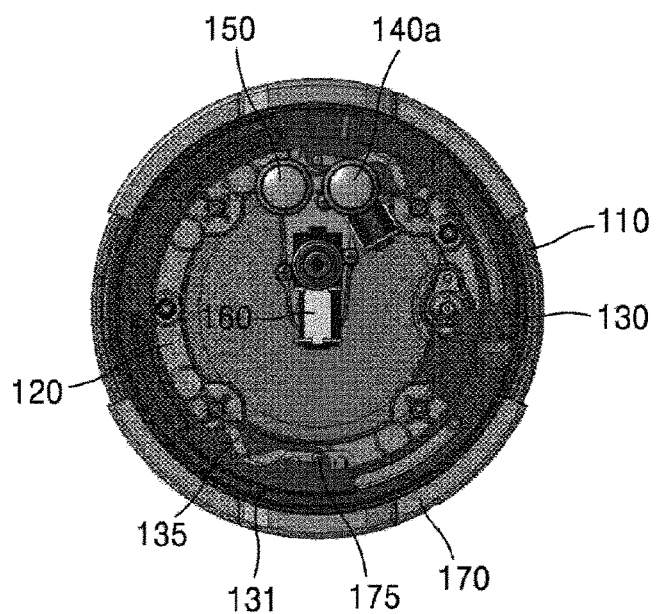

FIGS. 15A, 15B and 15C illustrate plan views each showing an operating state of the lid assembly 100a depending on a rotation angle of the rotation cover 130. FIG. 16 is a table representing a change in the position of the guide protrusion 175, the position of the locking structure 170, the position of the lift pin 181, the posotion of the shutter structure 310, and a change in the pressure of the inner pot 210 according to a change in the rotation position of the manipulation handle 183 in the cooking device including the assembly of FIG. 13. For reference, the position of the locking structure 170, the position of the lift pin 181, the position of the shutter structure 310, and the pressure of the inner pot 210 when the manipulation handle 183 is located at the third rotation position are the same as those when the manipulation handle 183 is located at the fourth rotation position, and are thus omitted from the table of FIG. 16.

Hereinafter, a method of operating a cooking device including the lid assembly 100a will be described with reference to FIGS. 13 to 16 together with FIGS. 6A to 10.

FIG. 15A is a plan view illustrating the main components of the lid assembly 100a when the manipulation handle 183 is located at the first rotation position.

As illustrated in FIG. 15A, when the manipulation handle 183 is located at the first rotation position, the guide protrusion 175 is located at the first position P1 of the guide groove 135, and as illustrated in FIG. 8A, the locking structure 170 is located at the locking position where the engagement protrusion 177 of the locking structure 170 is engaged with the flange portion 211 of the inner pot 210.

When the manipulation handle 183 is located at the first rotation position, since the lift pin 181 supported on the first surface portion 137 of the first rotation cover 130 is raised to the pin-up position as illustrated in FIG. 6A, the outlet of the first upper flow path 143P in the first pressure control device 140a and the outlet of the second flow path 151P in the second pressure control device 150 can be forcibly opened. In addition, when the manipulation handle 183 is located at the first rotation position, the controller may apply, to the shutter structure 310, the first control signal for placing the shutter structure 310 at the opening position based on the information detected by the detector. The shutter structure 310 operates in response to the first control signal and is located at the opening position of opening the first lower flow path 141Pa. In this case, while cooking is in progress, since the steam generated in the accommodation space in the inner pot 210 escapes to the outside through the first pressure control device 140a and the second pressure control device 150, the pressure of the accommodation space in the inner pot 210 can be maintained at no pressure (e.g., atmospheric pressure or a pressure close thereto).

FIG. 15B is a plan view illustrating the main components of the lid assembly 100a when the manipulation handle 183 is located at the second rotation position.

As illustrated in FIGS. 15A and 15B, when the manipulation handle 183 is switched from the first rotation position to the second rotation position, the guide protrusion 175 may move from the first position P1 to the second position P2 of the guide groove 135, and the locking structure 170 may move outward in the radial direction to be located at the unlocking position, as illustrated in FIG. 8B. Since the engagement protrusion 177 is not engaged with the inner pot 210 at the unlocking position of the locking structure 170, rotation for opening the lid assembly 100a is possible. Accordingly, when the manipulation handle 183 is located at the second rotation position, it is possible to open the lid assembly 100a and to perform tasks such as introducing cooking ingredients and checking the cooking state.

When the manipulation handle 183 is located at the second rotation position, as in the case where the manipulation handle 183 is located at the first rotation position, the lift pin 181 may be located at the pin-up position.

In addition, when the manipulation handle 183 is located at the second rotation position, the controller may apply, to the shutter structure 310, the first control signal for placing the shutter structure 310 at the opening position based on the information detected by the detector. The shutter structure 310 operates in response to the first control signal and is located at the opening position of opening the first lower flow path 141Pa. Accordingly, while cooking is in progress, since the steam generated in the accommodation space in the inner pot 210 escapes to the outside through the first pressure control device 140a and the second pressure control device 150, the pressure of the accommodation space in the inner pot 210 can be maintained at no pressure (e.g., atmospheric pressure or a pressure close thereto).

FIG. 15C is a plan view illustrating the main components of the lid assembly 100a when the manipulation handle 183 is located at the fourth rotation position.

As illustrated in FIGS. 15B and 15C, when the manipulation handle 183 is switched from the second rotation position to the fourth rotation position, the guide protrusion 175 may move from the second position P2 to the fourth position P4 of the guide groove 135, and the locking structure 170 may move inward in the radial direction to be located at the locking position, as illustrated in FIG. 8A.

When the manipulation handle 183 is located at the fourth rotation position, as illustrated in FIG. 6B, the lift pin 181 supported on the second surface portion 138 of the first rotation cover 130 may be lowered to the pin-down position, and the steam pressure of the accommodation space in the inner pot 210 can be adjusted by the first pressure control device 140a and/or the second pressure control device 150.

When the manipulation handle 183 is located at the fourth rotation position, the controller may apply, to the shutter structure 310, one of the first control signal for placing the shutter structure 310 at the opening position and the second control signal for placing the shutter structure 310 at the closing position based on the information detected by the detector may be applied to the shutter structure 310. For example, the controller may be configured to apply the first control signal or the second control signal to the shutter structure 310 according to a predetermined cooking recipe. For example, the controller may apply, to the shutter structure 310, the first control signal or the second control signal depending on a cooking time according to a predetermined cooking recipe to adjust the steam pressure of the accommodation space in the inner pot 210.

When the manipulation handle 183 is located at the fourth rotation position and the controller applies the first control signal to the shutter structure 310, as illustrated in FIG. 14A, the shutter rod 313 may be located at the opening position of opening the first lower flow path 141Pa, and the first lower flow path 141Pa and the first upper flow path 143P may communicate with each other. Accordingly, while cooking is in progress, the steam generated in the accommodation space in the inner pot 210 flows to the first lower flow path 141Pa and the first upper flow path 143P in the first pressure control device 140a, and the pressure of the accommodation space in the inner pot 210 may be determined by the first pressure control device 140a. Since the steam is discharged to the outside through the first pressure control device 140a when the steam pressure in the accommodation space in the inner pot 210 is increased to a predetermined first pressure or a level close thereto, the pressure of the accommodation space in the inner pot 210 can be maintained at the first pressure or a level close thereto.

When the manipulation handle 183 is located at the fourth rotation position and the controller applies the second control signal to the shutter structure 310, as illustrated in FIG. 14B, the shutter rod 313 is located at the closing position of closing the first lower flow path 141Pa, and steam discharge through the first pressure control device 140a is disabled while cooking is in progress. In this case, the steam generated in the accommodation space in the inner pot 210 flows into the second flow path 151P of the second pressure control device 150, and the pressure of the accommodation space in the inner pot 210 may be determined by the second pressure control device 150. Since the steam is discharged to the outside through the second pressure control device 150 when the steam pressure in the accommodation space in the inner pot 210 is increased to a predetermined second pressure or a level close thereto, the pressure of the accommodation space in the inner pot 210 can be maintained at the second pressure or a level close thereto.

Figure 17:
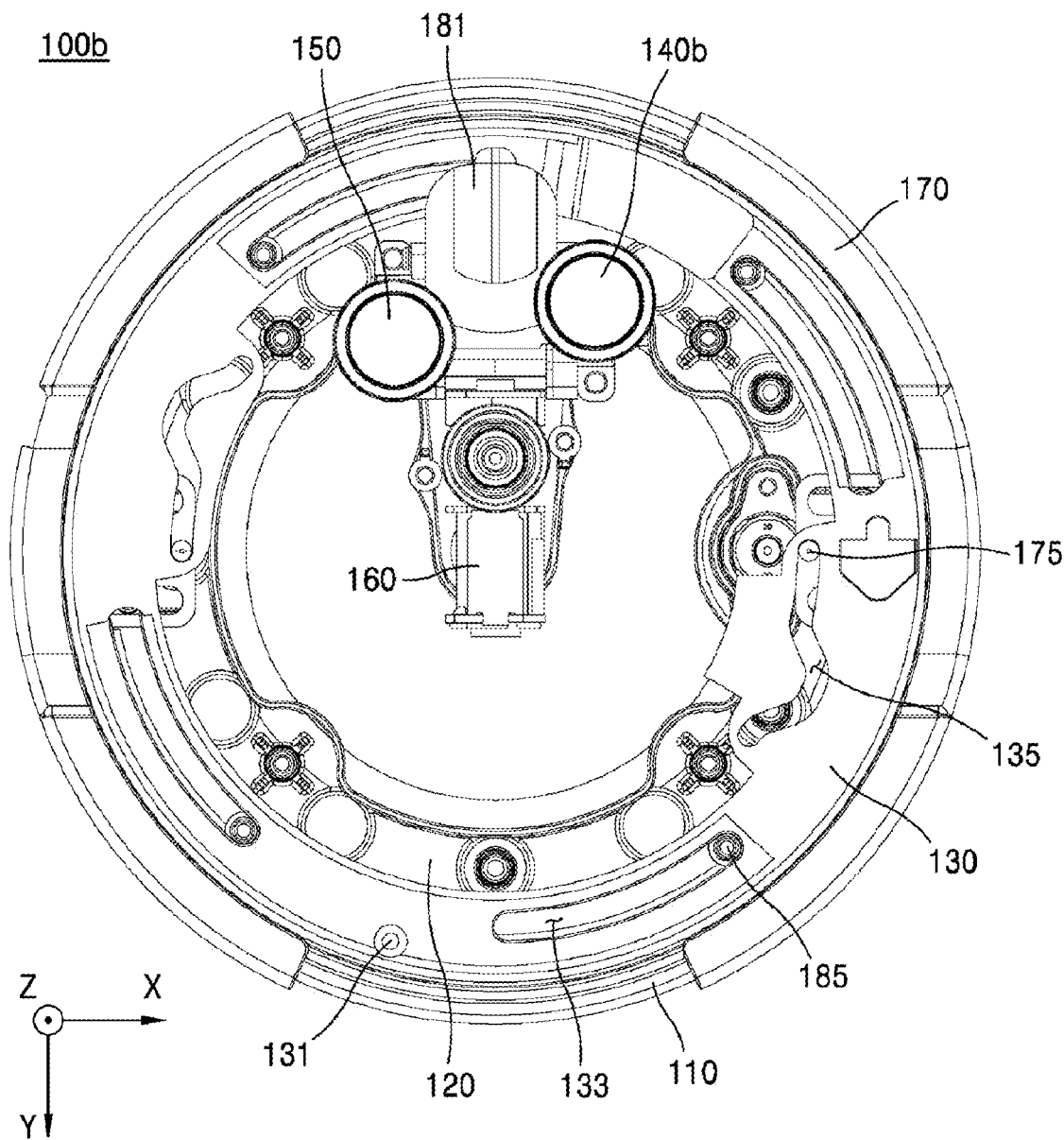
FIG. 17 is a plan view illustrating main components of a lid assembly of a cooking device according to exemplary embodiments of the present disclosure.
Figure 18:
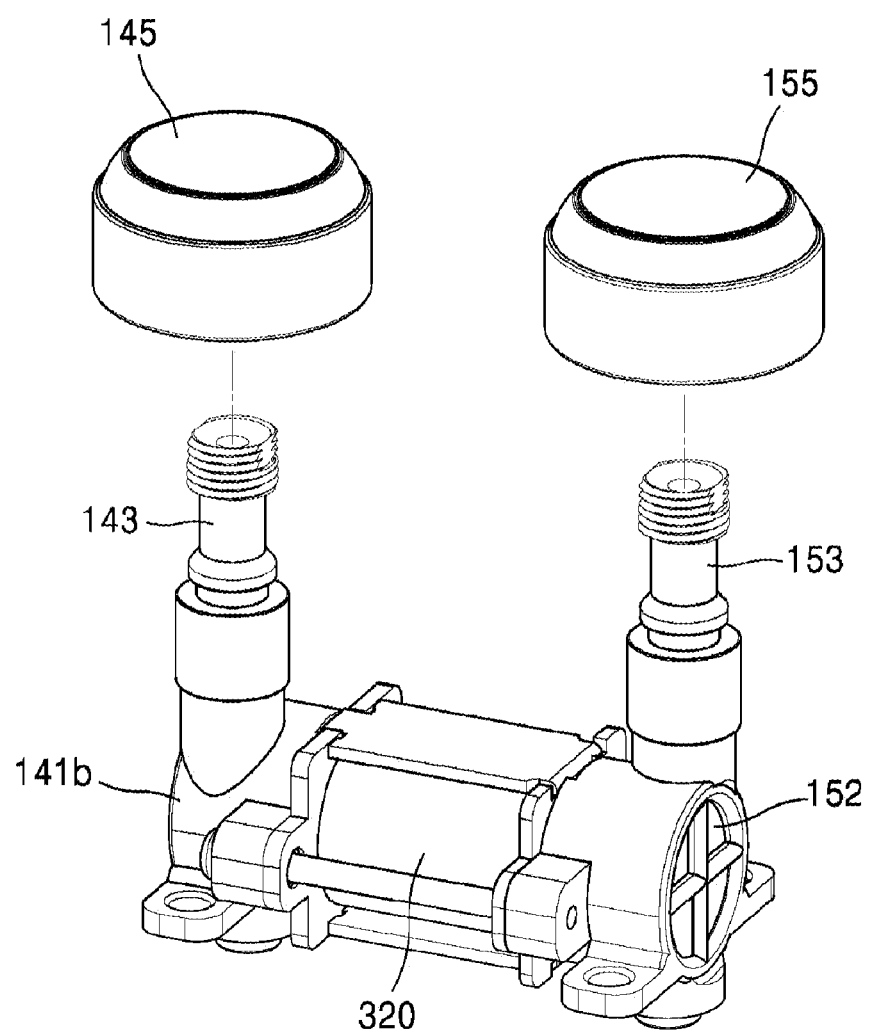
FIG. 18 is a perspective view illustrating a pressure control device of the lid assembly of FIG. 17.
Figure 19A:
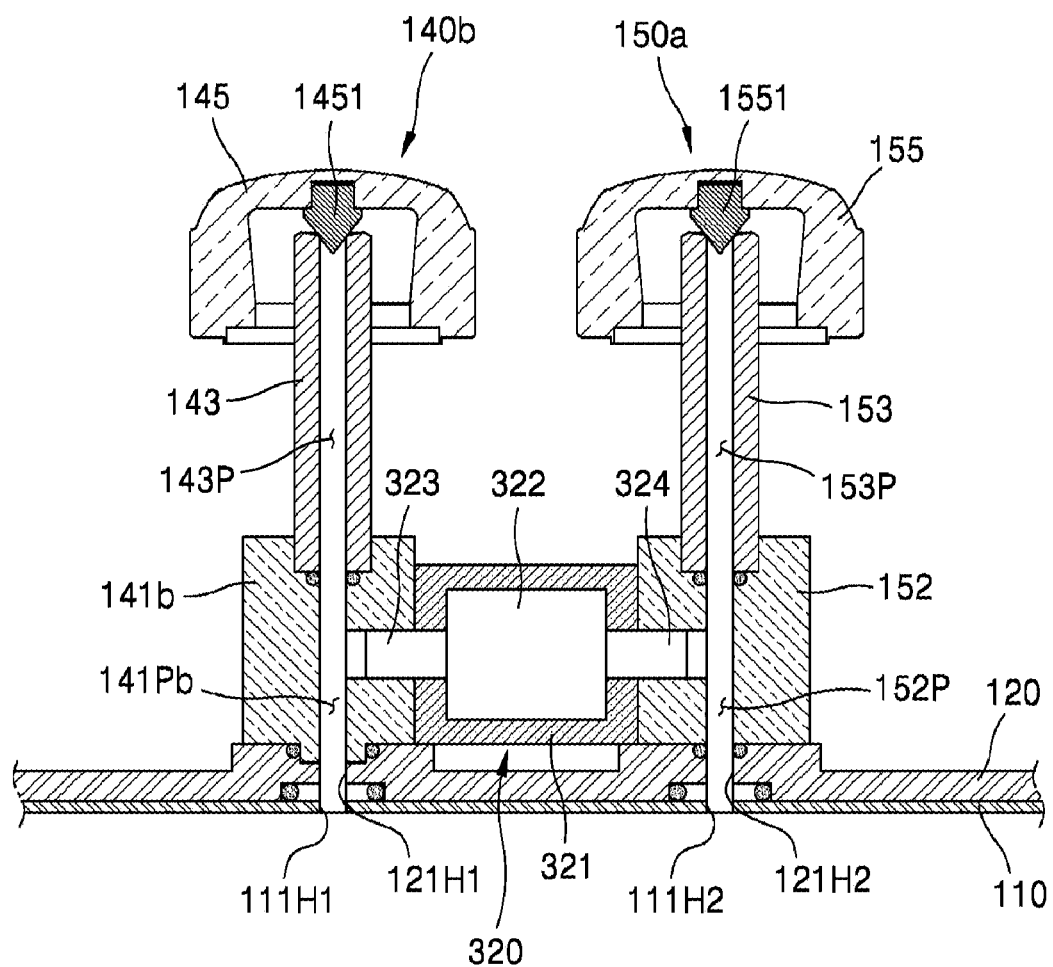
FIGS. 19A to 19C are cross-sectional views illustrating the pressure control device of the lid assembly of FIG. 17.
Figure 19B:
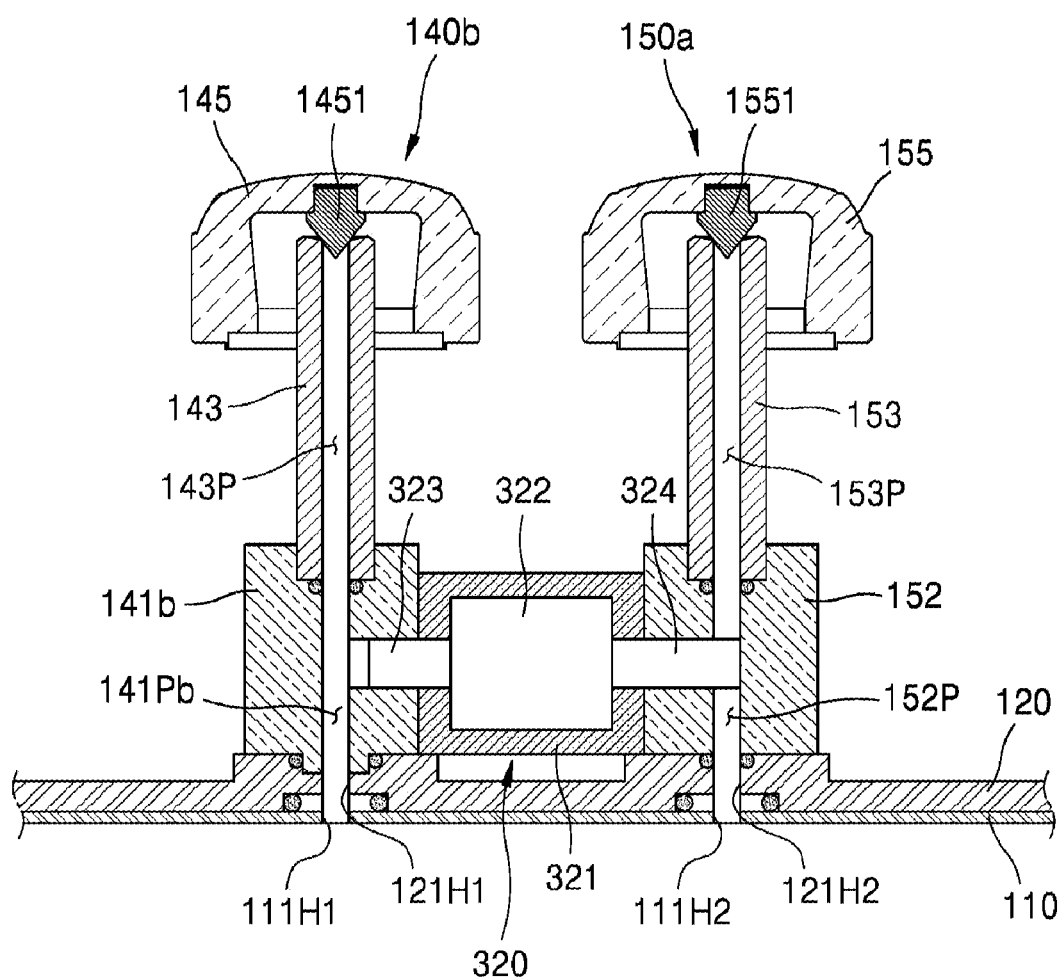
Figure 19C:
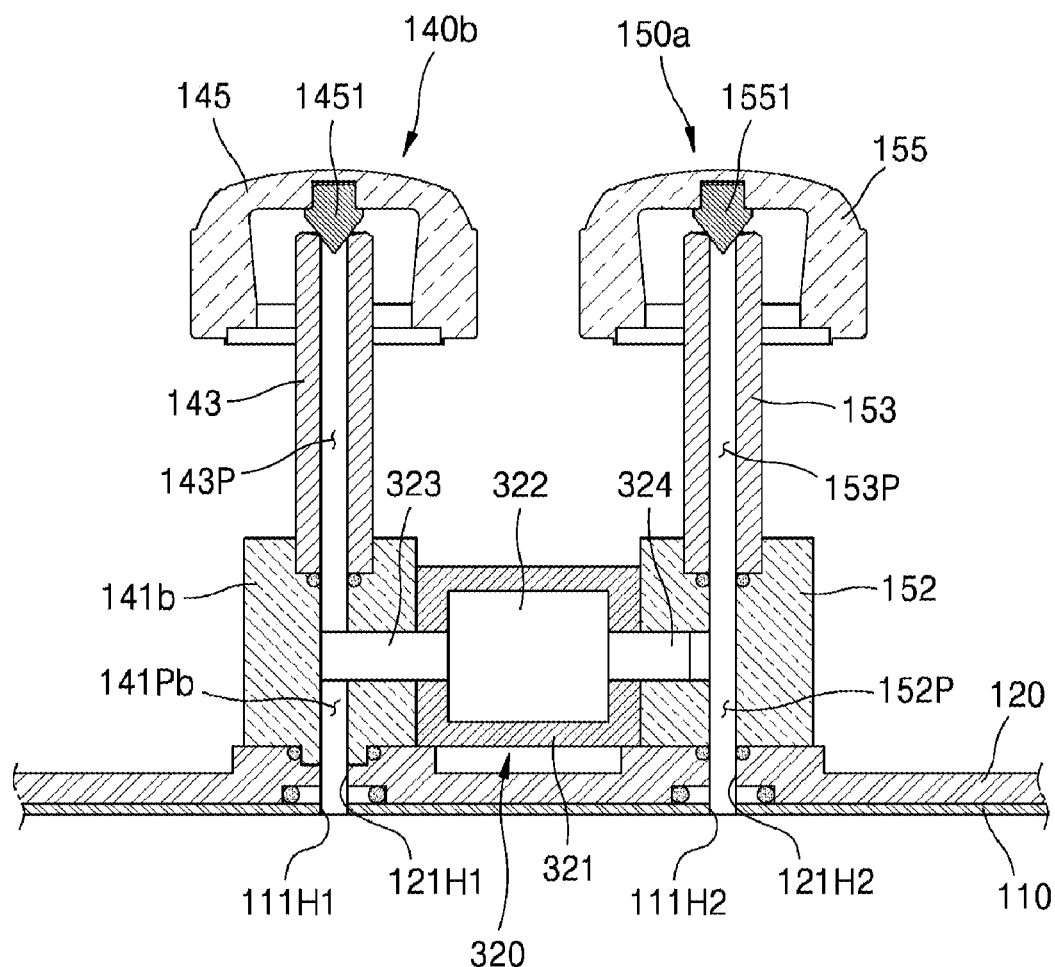

FIG. 17 is a plan view illustrating the main components of a lid assembly 100b of a cooking device according to exemplary embodiments of the present disclosure. FIG. 18 is a perspective view illustrating a pressure control device 103b of the lid assembly 100b of FIG. 17. FIGS. 19A to 19C are cross-sectional views illustrating a pressure control device 103b of the lid assembly 100b of FIG. 17.

FIG. 19A illustrates a state when a first shutter rod 323 is located at the opening position of opening a first lower flow path 141Pb and a second shutter rod 324 is located at the opening position of opening a second lower flow path 152P. FIG. 19B illustrates a state when the first shutter rod 323 is located at the opening position of opening the first lower flow path 141Pb and the second shutter rod 324 is located at the closing position of closing the second lower flow path 152P. FIG. 19C illustrates a state when the first shutter rod 323 is located at the closing position of closing the first lower flow path 141Pb and the second shutter rod 324 is located at the opening position of opening the second lower flow path 152P.

The lid assembly 100b illustrated in FIGS. 17, 18, and 19A to 19C may be substantially similar to the lid assembly 100a described with reference to FIGS. 13 to 16 except for differences in the configuration and operation of the pressure control device 103b. Hereinafter, the lid assembly 100b illustrated in FIGS. 17, 19A to 19C and a cooking device including the same will be described, focusing on differences from the lid assembly 100a described with reference to FIGS. 13 to 16 and the cooking device including the same.

Referring to FIGS. 17, 18, and 19A to 19C, the pressure control device 103b may include a first pressure control device 140b configured to form a first pressure in the accommodation space in the inner pot 210, a second pressure control device 150a configured to form a second pressure higher than the first pressure in the accommodation space in the inner pot 210, and a shutter structure 320 configured to control steam discharge through each of the first pressure control device 140b and the second pressure control device 150a. Each of the first pressure control device 140b and the second pressure control device 150a may be an electronically controlled valve configured to control whether steam is discharged in response to an electrical control signal.

The first pressure control device 140b may include a first cylinder including a first lower cylinder 141b and a first upper cylinder 143 connected in the vertical direction, and a first weight 145.

The first lower cylinder 141b may include a first lower flow path 141Pb communicating with the accommodation space in the inner pot 210. The first lower flow path 141Pb may communicate with the accommodation space in the inner pot 210 through the first upper steam hole 121H1 in the top plate 120 and the first lower steam hole 111H1 in the inner pot cover 110. The first lower flow path 141Pb may extend upward from the inlet communicating with the first upper steam hole 121H1 in the top plate 120 to the outlet in the first lower cylinder 141b.

The first upper cylinder 143 may be disposed on the first lower cylinder 141b and may include a first upper flow path 143P communicating with the first lower cylinder 141b. The first upper flow path 143P may extend upward from an inlet communicating with the outlet of the first lower cylinder 141b to an outlet provided at the upper side of the first upper cylinder 143.

The first weight 145 may be disposed on the first upper cylinder 143. The first weight 145 may include a first pressure protrusion 1451 configured to be inserted into the outlet of the first upper flow path 143P. The first pressure protrusion 1451 may open/close the outlet of the first upper flow path 143P depending on the level of the steam pressure formed in the first upper flow path 143P.

The second pressure control device 150a may include a second cylinder including a second lower cylinder 152 and a second upper cylinder 153 connected in the vertical direction, and a second weight 155.

The second lower cylinder 152 may include a second lower flow path 152P communicating with the accommodation space in the inner pot 210. The second lower flow path 152P may communicate with the accommodation space in the inner pot 210 through the second upper steam hole 121H2 in the top plate 120 and the second lower steam hole 111H2 in the inner pot cover 110. The second lower flow path 152P may extend upward from an inlet communicating with the second upper steam hole 121H2 in the top plate 120 to an outlet provided at the upper side of the second lower cylinder 152.

The second upper cylinder 153 may be disposed on the second lower cylinder 152 and may include a second upper flow path 153P communicating with the second lower flow path 152P. The second upper flow path 153P may extend upward from an inlet communicating with the outlet of the second lower cylinder 152 to an outlet provided at the upper side of the second upper cylinder 153.

The second weight 155 may be disposed on the second upper cylinder 153. The second weight 155 may include a second pressure protrusion 1551 configured to be inserted into the outlet of the second upper flow path 153P. The second pressure protrusion 1551 may open/close the outlet of the second upper flow path 153P depending on the level of the steam pressure formed in the second upper flow path 153P.

The shutter structure 320 may include a frame 321 mounted on the top plate 120, a first shutter rod 323 movabley mounted to the frame 321 and configured to open/close the first lower flow path 141Pb, and a second shutter rod 324 movably mounted to the frame 311 and configured to open/close the second lower flow path 152P. The first shutter rod 323 may be configured to linearly move between an opening position of opening the first lower flow path 141Pb and a closing position of closing the first lower flow path 141Pb. The second shutter rod 324 may be configured to linearly move between an opening position of opening the second lower flow path 152P and a closing position of closing the second lower flow path 152P. The first shutter rod 323 and the second shutter rod 324 may be connected to the actuator 322, and the movement of the first shutter rod 323 and the movement of the second shutter rod 324 may be controlled by the actuator 322.

As illustrated in FIG. 19C, when the first shutter rod 323 is located at the closing position, since a portion of the first shutter rod 323 is inserted into the middle portion of the first lower flow path 141Pb to close the first lower flow path 141Pb, steam discharge through the first pressure control device 140b may be disabled. As illustrated in FIGS. 19A and 19B, when the first shutter rod 323 is located at the opening position, the first shutter rod 323 may be located at a position retracted from the closing position such that the first lower flow path 141Pb is not blocked.

As illustrated in FIG. 19B, when the second shutter rod 324 is located at the closing position, since a portion of the second shutter rod 324 is inserted into the middle portion of the second lower flow path 152P to close the second lower flow path 152P, steam discharge through the second pressure control device 150a may be disabled. As illustrated in FIGS. 19A and 19C, when the second shutter rod 324 is located at the opening position, the second shutter rod 324 may be located at a position retracted from the closing position such that the second lower flow path 152P is not blocked.

In exemplary embodiments, the cooking device may include a detector configured to detect the rotation position of the manipulation handle (183 in FIG. 10) and/or the rotation position of the rotation cover 130, and a controller configured to generate a control signal to be applied to the pressure control device 103b based on the information detected by the detector. The detector may include a sensor, such as a reed switch, an optical sensor, or a mechanical sensor. The controller may include a microcontroller chip and may be mounted on the main body (200 in FIG. 1).

The detector may be configured to detect the rotation position of the manipulation handle 183 and/or the rotation position of the rotation cover 130. Alternatively, the detector may be configured to detect a change in the position of the guide protrusion 175 in the guide groove 135 that varies according to the rotation of the rotation cover 130 and/or a change in the position of the fastening structure 185 in the rotation restriction groove 133 that varies according to the rotation of the rotation cover 130.

Based on the information detected by the detector, the controller may generate a first control signal for positioning the first shutter rod 323 at the opening position, a second control signal for positioning the first shutter rod 323 at the closing position, a third control signal for positioning the second shutter rod 324 at the opening position; and a fourth control signal for positioning the second shutter rod 324 at the closing position.

Hereinafter, a pressure control process by the pressure control device 103b will be described in more detail.

As illustrated in FIG. 19A, the controller may apply the first control signal and the third control signal to the actuator 322 to place each of the first shutter rod 323 and the second shutter rod 324 at the opening position. When each of the first shutter rod 323 and the second shutter rod 324 is located at the opening position, the first lower flow path 141Pb and the first upper flow path 143P in the first pressure control device 140b communicate with each other, and the second lower flow path 152P and the second upper flow path 153P in the second pressure control device 150a may communicate with each other. In this case, since the first pressure control device 140b is configured to maintain the steam pressure of the accommodation space in the inner pot 210 at a level lower than that of the second pressure control device 150a, the steam generated in the inner pot 210 may generally be discharged through the first pressure control device 140b. When the steam pressure of the accommodation space in the inner pot 210 increases to the predetermined first pressure or a level close thereto, the first pressure protrusion 1451 of the first weight 145 is lifted by the steam pressure so that the outlet of the first upper flow path 143P can be opened, and while the steam is discharged to the outside, the steam pressure of the accommodation space in the inner pot 210 can be maintained at the first pressure or a level close thereto.

As illustrated in FIG. 19B, the controller may apply the first control signal and the fourth control signal to the actuator 322 to place the first shutter rod 323 at the opening position and the second shutter rod 324 at the closing position. Since the second lower flow path 152P is closed by the second shutter rod 324, steam discharge through the second pressure control device 150a is disabled. In this case, the steam generated in the inner pot 210 may be discharged through the first pressure control device 140b. When the steam pressure of the accommodation space in the inner pot 210 increases to the predetermined first pressure or a level close thereto, the first pressure protrusion 1451 of the first weight 145 is lifted by the steam pressure so that the outlet of the first upper flow path 143P can be opened, and while the steam is discharged to the outside, the steam pressure of the accommodation space in the inner pot 210 can be maintained at the first pressure or a level close thereto.

As illustrated in FIG. 19C, the controller may apply the second control signal and the third control signal to the actuator 322 to place the first shutter rod 323 at the closing position and the second shutter rod 324 at the opening position. Since the first lower flow path 141Pb is closed by the first shutter rod 323, steam discharge through the first pressure control device 140b is disabled. In this case, the steam generated in the inner pot 210 may be discharged through the second pressure control device 150a. When the steam pressure of the accommodation space in the inner pot 210 increases beyond the first pressure to a second pressure or a level close thereto, the second pressure protrusion 1551 of the second weight 155 is lifted by the steam pressure so that the outlet of the second flow path 151P can be opened, and while the steam is discharged to the outside, the steam pressure of the accommodation space in the inner pot 210 can be maintained at the second pressure or a level close thereto.

FIG. 20 is a table representing a change in the position of the guide protrusion 175, the operation of the locking structure 170, the position of the lift pin 181, the position of the shutter structure 320, and a change in the pressure of the inner pot 210 according to a change in the rotation position of the manipulation handle 183 in the cooking device including the assembly of FIG. 17. For reference, the position of the locking structure 170, the position of the lift pin 181, the position of the first shutter rod 323, the position of the second shutter rod 324, and the pressure of the inner pot when the manipulation handle 183 is located at the third rotation position are the same as those when the manipulation handle 183 is located at the fourth rotation position, and are thus omitted from the table of FIG. 20.

Hereinafter, with reference to FIGS. 17 to 20 together with FIGS. 6A to 10, a method of operating a cooking device including the lid assembly 100b will be described, focusing on differences from the method of operating the cooking device including the lid assembly 100a described with reference to FIGS. 13 to 16.

When the manipulation handle 183 is located at the first rotation position, as in the lid assembly 100a described above with reference to FIGS. 13 to 16, the locking structure 170 may be located at the locking position.

When the manipulation handle 183 is located at the first rotation position, as in the lid assembly 100a described above with reference to FIGS. 13 to 16, the outlet of the first upper flow path 143P in the first pressure control device 140b and the outlet of the second upper flow path 153P in the second pressure control device 150a may be opened by the lift pin 181 raised to the pin-up position. In addition, when the manipulation handle 183 is located at the first rotation position, the controller may apply the first control signal and the third control signal to the shutter structure 320 to place the first shutter rod 323 and the second shutter rod 324 at the opening position. In this case, while cooking is in progress, since the steam generated in the accommodation space in the inner pot 210 escapes to the outside through the first pressure control device 140b and the second pressure control device 150a, the pressure of the accommodation space in the inner pot 210 can be maintained at no pressure (e.g., atmospheric pressure or a pressure close thereto).

When the manipulation handle 183 is located at the second rotation position, as in the lid assembly 100a described above with reference to FIGS. 13 to 16, the locking structure 170 may be located at the locking position.

When the manipulation handle 183 is located at the second rotation position, as in the lid assembly 100a described above with reference to FIGS. 13 to 16, the outlet of the first upper flow path 143P in the first pressure control device 140b and the outlet of the second upper flow path 153P in the second pressure control device 150a may be opened by the lift pin 181 raised to the pin-up position. In addition, when the manipulation handle 183 is located at the second rotation position, the controller may apply the first control signal and the third control signal to the shutter structure 320 to place the first shutter rod 323 and the second shutter rod 324 at the opening position. In this case, while cooking is in progress, since the steam generated in the accommodation space in the inner pot 210 escapes to the outside through the first pressure control device 140b and the second pressure control device 150a, the pressure of the accommodation space in the inner pot 210 can be maintained at no pressure (e.g., atmospheric pressure or a pressure close thereto).

When the manipulation handle 183 is located at the fourth rotation position, as in the lid assembly 100a described above with reference to FIGS. 13 to 16, the locking structure 170 may be located at the locking position.

When the manipulation handle 183 is located at the fourth rotation position, as in the lid assembly 100a described above with reference to FIGS. 13 to 16, the lift pin 181 may be lowered to the pin-down position, and the steam pressure of the accommodation space in the inner pot 210 may be adjusted by the first pressure control device 140b and/or the second pressure control device 150a.

When the manipulation handle 183 is located at the fourth rotation position, based on the information detected by the detector, the controller may apply one of the first control signal and the second control signal to the first shutter rod 323 and one of the third control signal and the fourth control signal to the second shutter rod 324. For example, according to a predetermined cooking recipe, the controller may apply one of the first control signal and the second control signal to the first shutter rod 323 and one of the third control signal and the fourth control signal to the second shutter rod 324. For example, the controller may adjust the steam pressure of the accommodation space in the inner pot 210 by adjusting a control signal applied to the shutter structure 320 depending on a cooking time according to a predetermined cooking recipe.

When the manipulation handle 183 is located at the fourth rotation position, the first control signal is applied to the first shutter rod 323, the third control signal is applied to the second shutter rod 324, and each of the first shutter rod 323 and the second shutter rod 324 may be located at the opening position as illustrated in FIG. 19A. In this case, since the first pressure control device 140b is configured to maintain the steam pressure of the accommodation space in the inner pot 210 at a level lower than that of the second pressure control device 150a, the steam generated in the inner pot 210 may generally be discharged through the first pressure control device 140b. Accordingly, the steam pressure of the accommodation space in the inner pot 210 can be maintained at the first pressure or a level close thereto.

When the manipulation handle 183 is located at the fourth rotation position, the first control signal is applied to the first shutter rod 323 and the fourth control signal is applied to the second shutter rod 324, the first shutter rod 323 may be located at the opening position and the second shutter rod 324 may be located at the closing position as illustrated in FIG. 19B. In this case, steam discharge through the second pressure control device 150a is disabled, and steam generated in the inner pot 210 can be discharged through the first pressure control device 140b. Accordingly, the steam pressure of the accommodation space in the inner pot 210 can be maintained at the first pressure or a level close thereto.

When the manipulation handle 183 is located at the fourth rotation position, the second control signal is applied to the first shutter rod 323 and the third control signal is applied to the second shutter rod 324, the first shutter rod 323 may be located at the closing position and the second shutter rod 324 may be located at the opening position as illustrated in FIG. 19C. In this case, steam discharge through the first pressure control device 140b is disabled, and steam generated in the inner pot 210 can be discharged through the second pressure control device 150a. Accordingly, the steam pressure of the accommodation space in the inner pot 210 can be maintained at the second pressure or a level close thereto.

As described above, exemplary embodiments have been disclosed in the drawings and specification. Although the embodiments have been described by using specific terms in the present specification, the terms have only been used for the purpose of describing the technical ideas of the present disclosure, and are not intended to limit the meaning of the terms or the scope of the present disclosure defined in the claims. Therefore, a person ordinarily skilled in the art will understand that various modifications and equivalents of other embodiments are possible from the embodiments. Therefore, the true technical scope of protection of the present disclosure should be determined based on the technical ideas of the appended claims.

What is claimed is:

1. A cooking device comprising:
a main body configured to accommodate an inner pot;
a top plate provided in a lid cover coupled to the main body;
a rotation cover rotatably coupled to the top plate to be rotatable along an edge of the top plate;
a first pressure control device comprising:
a first lower cylinder which comprises a first lower flow path communicating with an accommodation space in the inner pot,
a first upper cylinder which is disposed on the first lower cylinder and comprises a first upper flow path,
a first weight which is disposed on the first upper cylinder and configured to open/close the first upper flow path depending on a steam pressure of the accommodation space in the inner pot, and
a shutter structure which is configured to switch between an opening position for opening an outlet of the first lower flow path such that the first lower flow path and the first upper flow path communicate with each other and a closing position for closing the outlet of the first lower flow path such that the first lower flow path and the first upper flow path do not communicate with each other; and
a second pressure control device comprising:
a second cylinder which comprises a second flow path communicating with the accommodation space in the inner pot, and
a second weight which is disposed on the second cylinder and configured to open/close the second flow path depending on the steam pressure of the accommodation space in the inner pot,
wherein the first pressure control device is configured to maintain the steam pressure of the accommodation space in the inner pot at a first pressure when the shutter structure is in the opening position and the steam pressure of the accommodation space in the inner pot is capable of being increased to a pressure higher than the first pressure when the shutter structure is in the closing position.

2. The cooking device of claim 1,
wherein the second pressure control device is configured to maintain the steam pressure of the accommodation space in the inner pot at a second pressure higher than the first pressure.

3. The cooking device of claim 1, wherein the shutter structure comprises:
a shutter frame coupled to the first lower cylinder;
a shutter rod movably mounted to the shutter frame;
an elastic cover coupled to an end portion of the shutter rod facing the outlet of the first lower flow path; and
a first elastic body configured to elastically support the shutter rod.

4. The cooking device of claim 3, further comprising a push structure configured to press the shutter structure so that the shutter structure is fixed at the closing position, wherein the push structure is coupled to the rotation cover and is configured to selectively press the shutter structure depending on a rotation angle of the rotation cover.

5. The cooking device of claim 4, wherein the push structure comprises:
a fixed body coupled to the rotation cover;
a second elastic body mounted to the fixed body; and
a movable body which is elastically supported by the second elastic body to be capable of pressing the shutter rod.

6. The cooking device of claim 1, further comprising a lift pin mounted to the lid cover to be movable up and down,
wherein the lift pin is configured to move up and down between a pin-down position and a pin-up position depending on a rotation angle of the rotation cover, and
wherein the lift pin is located at the pin-up position to lift the first weight such that the outlet of the first upper flow path in the first upper cylinder is forcibly opened and to lift the second weight such that the outlet of the second flow path in the second cylinder is forcibly opened.

7. The cooking device of claim 1, further comprising a locking structure comprising an engagement protrusion configured to be engaged with a flange portion of the inner pot,
wherein the locking structure is mounted on the top plate to be linearly movable, and
wherein the locking structure is configured to linearly move, depending on a rotation angle of the rotation cover, between a locking position where the engagement protrusion is located to vertically overlap the flange portion of the inner pot and an unlocking position that is spaced radially outward from the locking position.

8. The cooking device of claim 7, wherein the rotation cover comprises a guide groove that has a first position, a second position, a third position, and a fourth position sequentially disposed along an extension direction thereof,
wherein the first position, the third position, and the fourth position of the guide groove are each spaced apart from a rotation center of the rotation cover by a first distance,
wherein the second position of the guide groove is spaced apart from the rotation center of the rotation cover by a second distance greater than the first distance,
wherein the locking structure further comprises a guide protrusion accommodated in the guide groove and located at one of the first to fourth positions of the guide groove depending on the rotation angle of the rotation cover,
wherein, when the guide protrusion is located at the first position, the third position, and the fourth position of the guide groove, the locking structure is located in the locking position, and
wherein, when the guide protrusion of the locking structure is located at the second position of the guide groove, the locking structure is located at the unlocking position.

9. The cooking device of claim 8, further comprising:
a lift pin configured to move up and down between a pin-down position and a pin-up position depending on the rotation angle of the rotation cover and selectively press the first weight and the second weight; and
a push structure configured to selectively press the shutter structure depending on the rotation cover to switch the shutter structure between the opening position and the closing position,
wherein, when the guide protrusion of the locking structure is located at the first position and the second position of the guide groove, the lift pin is located at the pin-up position of lifting the first weight and the second weight such that the outlet of the first upper flow path in the first upper cylinder and the outlet of the second flow path in the second cylinder are forcibly opened, wherein, when the guide protrusion of the locking structure is located at the third position and the fourth position of the guide groove, the lift pin is located at the pin-down position lowered from the pin-up position, wherein, when the guide protrusion of the locking structure is located at the first position, the second position, and the third position of the guide groove, the push structure is spaced away from the shutter structure such that the shutter structure is located at the opening position, and wherein, when the guide protrusion of the locking structure is located at the fourth position of the guide groove, the push structure presses the shutter structure such that the shutter structure is fixed at the closing position.

* * * * *